(12) United States Patent
Shingai et al.

(10) Patent No.: US 12,448,228 B2
(45) Date of Patent: Oct. 21, 2025

(54) TRANSPORT DEVICE

(71) Applicant: JAPAN CASH MACHINE CO., LTD., Osaka (JP)

(72) Inventors: Keita Shingai, Osaka (JP); Shigenori Matsushita, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 117 days.

(21) Appl. No.: 18/406,645

(22) Filed: Jan. 8, 2024

(65) Prior Publication Data

US 2024/0228194 A1 Jul. 11, 2024

(30) Foreign Application Priority Data

Jan. 11, 2023 (JP) .................................. 2023-002379

(51) Int. Cl.
*B65G 51/02* (2006.01)
*B65H 5/22* (2006.01)

(52) U.S. Cl.
CPC .............. *B65G 51/02* (2013.01); *B65H 5/228* (2013.01); *B65H 2301/44332* (2013.01); *B65H 2701/1912* (2013.01)

(58) Field of Classification Search
None
See application file for complete search history.

(56) References Cited

U.S. PATENT DOCUMENTS

| | | | | |
|---|---|---|---|---|
| 4,805,761 | A * | 2/1989 | Totsch | B65G 54/02 198/690.1 |
| 5,388,526 | A * | 2/1995 | Imai | B65G 54/025 104/138.1 |
| 9,873,574 | B2 * | 1/2018 | Kakuho | H05K 13/028 |
| 10,720,864 | B2 * | 7/2020 | Huang | H02K 11/35 |
| 12,148,261 | B2 * | 11/2024 | Nishimura | G07D 11/13 |
| 12,269,704 | B2 * | 4/2025 | Ichikawa | B65H 5/004 |

(Continued)

FOREIGN PATENT DOCUMENTS

| | | | |
|---|---|---|---|
| JP | 01145922 | A * | 6/1989 |
| JP | 2014-133623 | A | 7/2014 |

(Continued)

OTHER PUBLICATIONS

Japan Patent Office, Office Action with English Translation dated Dec. 10, 2024 in Japanese Patent Application No. 2023-002379, 9 pages.

*Primary Examiner* — Joseph A Dillon, Jr.
(74) *Attorney, Agent, or Firm* — MASUVALLEY & PARTNERS; Peter Martinez

(57) ABSTRACT

To downsize a curved transport route through which a transport target is transported without being deformed.

A transport path 401 includes a first curved transport tubular-body unit 415B having a first curved shape in which a bottom surface 411B located beside an air blowing tube 100 bulges into a convex shape toward the air blowing tube. The first curved transport tubular-body unit is configured to increase a distance H between the bottom surface and a top surface 413B opposite to the bottom surface from each end portion toward an intermediate portion in a transport direction x to prevent a banknote P retained by a transport body 500 from coming into contact with the top surface.

5 Claims, 18 Drawing Sheets

(56) References Cited

U.S. PATENT DOCUMENTS

| | | | | |
|---|---|---|---|---|
| 2015/0291378 | A1* | 10/2015 | Ogura | B65H 5/26 |
| | | | | 271/194 |
| 2021/0122576 | A1* | 4/2021 | Jones | B65G 35/06 |
| 2022/0297961 | A1 | 9/2022 | Ichikawa et al. | |
| 2023/0316843 | A1* | 10/2023 | Nakatake | B65G 54/025 |
| | | | | 406/11 |
| 2023/0416039 | A1 | 12/2023 | Ichikawa et al. | |
| 2024/0239618 | A1* | 7/2024 | Arai | B65G 51/36 |

FOREIGN PATENT DOCUMENTS

| | | | | | |
|---|---|---|---|---|---|
| JP | 6796684 | B2 | | 11/2020 | |
| JP | 2021020744 | A | * | 2/2021 | |
| JP | 2022-029862 | A | | 2/2022 | |
| JP | 2022-060767 | A | | 4/2022 | |
| JP | 2022-078613 | A | | 5/2022 | |
| JP | 2023175260 | A | * | 12/2023 | B65H 29/00 |
| JP | 2024099370 | A | * | 7/2024 | B65G 51/36 |
| TW | I866062 | B | * | 12/2024 | H02K 49/02 |

* cited by examiner

FIG.13
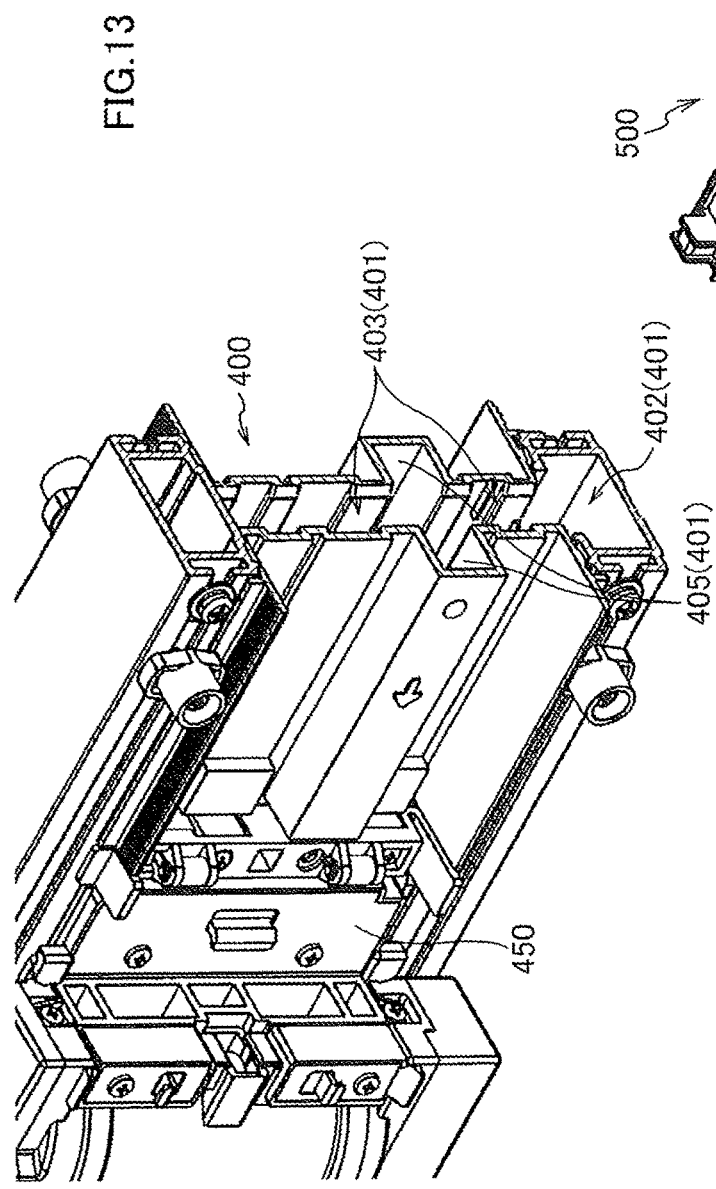
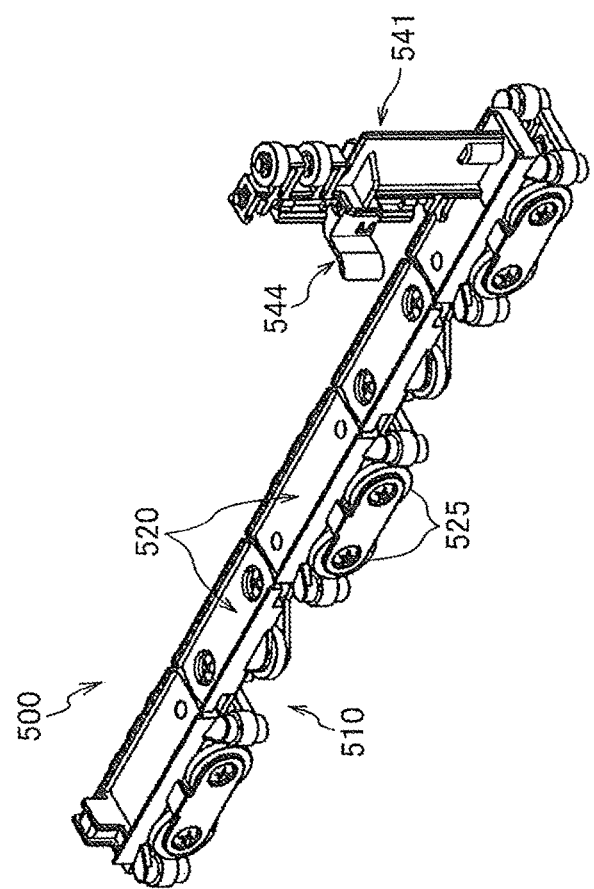

TRANSPORT DEVICE

CROSS-REFERENCE TO RELATED APPLICATION

This application is based upon and claims the benefit of priority to Japanese Patent Application No. 2023-002379, filed on Jan. 11, 2023, with the Japanese Patent Office, the entire contents of which are incorporated herein by reference in its entirety.

FIELD

The present invention relates to a transport device that transports a transport target such as banknotes.

BACKGROUND

In a game hall where various types of game machines such as pachinko machines, pachislot (pachinko-slot) machines, or slot machines are installed, game media dispensing devices for renting pachinko balls or tokens being game media to players according to the money amount of banknotes input through a banknote inlet are placed adjacent to the game machines. Various banknote transport devices are developed and proposed to transport banknotes received by the game media dispensing devices safely and smoothly to a cashbox. The banknote transport devices as described above are installed as game hall facilities in the game hall.

These banknotes transport devices are also used in game facilities, such as a casino, that handle a large amount of banknotes.

Japanese Patent Publication No. 6796684 discloses that a paper sheet transport device enabling a moving body to travel in an air blowing tube using an air flow and enabling a banknote transport body to travel using a magnetic force in conjunction with movement of the moving body is installed in each of game hall facilities in a game hall. The transport body transports banknotes to a cashbox while sequentially collecting and retaining banknotes received by game media dispensing devices in the process of moving on a moving route along the game media dispensing devices. Since no mechanical driving means such as a motor, a gear, and a transport belt are required to cause the moving body and the transport body to travel, the durability of members constituting the transport device can be increased and the running cost of the transport device can be reduced.

The paper sheet transport device disclosed in Japanese Patent Publication No. 6796684 employs a configuration to move the transport body in a long tubular body used for a transport body. In a case where the moving route for the transport body is straight in plan view, a plurality of short straight tubular-body units are directly connected in series at their respective end portions to each other.

Japanese Patent Application Laid-Open No. 2022-60767 describes a connecting tubular body that connects two adjacent straight tubular-body units in a non-straight manner. The connecting tubular body has a configuration in which a plurality of thinned annular pieces are stacked one after another. Inside the connecting tubular body, a curved internal space is formed to serve as a moving route for the transport body.

In Japanese Patent Publication No. 6796684 and Japanese Patent Application Laid-Open No. 2022-60767, a rectangular banknote is placed and transported on the transport body in an upright state with the longitudinal direction of the banknote aligned with the transport direction.

SUMMARY OF THE INVENTION

It is easy for a rectangular banknote to deform its banknote surface (the surface itself of the banknote) from a planar shape to a curved shape. However, it is difficult to curve and deform each side (long sides and short sides) of the banknote while maintaining the planar shape of the banknote. For this reason, in order to transport banknotes along a curved transport route, it is general to design a transport route through which the banknote surface itself is curved only in a planar direction as described in Japanese Patent Application Laid-Open No. 2022-60767. Assuming that a banknote is moved in a curved transport route while maintaining the planar shape of the banknote, it is necessary to increase the radius of curvature of the transport route. This leads to an increase in the size of the transport route.

The present invention has been made in view of the circumstances described above, and it is an object of the present invention to downsize a curved transport route through which a transport target is transported without being deformed.

In order to solve the above problems, a transport device according to the present invention comprises: an air blowing tube that forms a gas flow path; a moving body that travels inside the air blowing tube while receiving an air flow flowing within the air blowing tube in a predetermined direction; a transport body route that has at least a portion arranged along the air blowing tube to be adjacent to the air blowing tube; and a transport body that is configured to be able to retain a transport target in a predetermined attitude and that travels inside the transport body route, where the moving body includes a moving body magnetic material, while the transport body includes a transport body magnetic material, and where the transport device has a configuration to move the transport body in conjunction with movement of the moving body by using a repelling force generated based on a magnetic force applied between the moving body magnetic material and the transport body magnetic material when there is a proximal positional relation between the moving body magnetic material and the transport body magnetic material, wherein the transport body route includes a first curved transport body route having a first curved shape in which a bottom surface located beside the air blowing tube bulges into a convex shape toward the air blowing tube, and the first curved transport body route is configured to increase a distance between the bottom surface and a top surface opposite to the bottom surface from each end portion toward an intermediate portion in a transport direction to prevent the transport target retained by the transport body from coming into contact with the top surface.

According to the present invention, it is possible to downsize a curved transport route through which a transport target is transported without being deformed.

BRIEF DESCRIPTION OF DRAWINGS

FIG. 13 is a partial sectional view illustrating a location relation between a transport tube 400 and the transport body 500;

DESCRIPTION OF EMBODIMENTS

Figure 1:
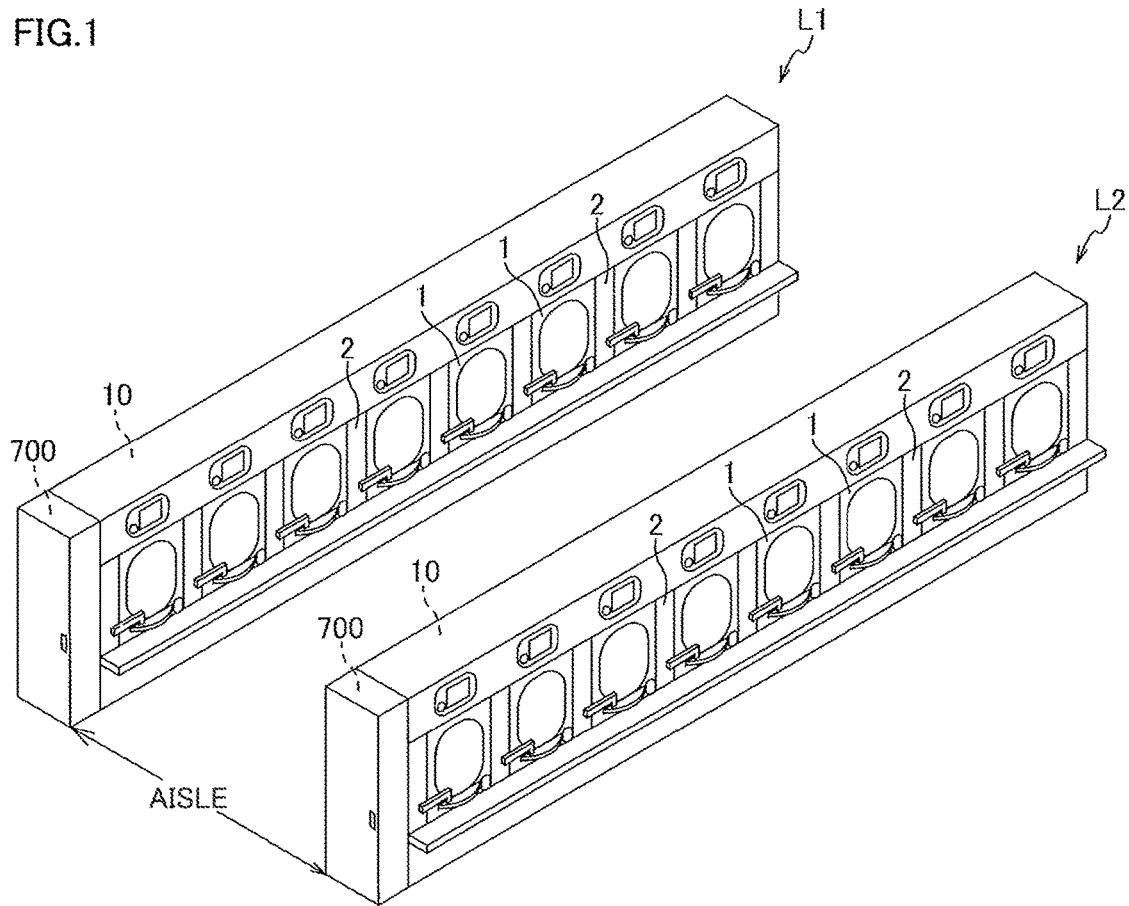
FIG. 1 is a perspective view illustrating a schematic configuration of game hall facilities including a plurality of game machines.

The present invention will be described below in detail with an embodiment illustrated in the drawings. Constituent elements, types, combinations, shapes, and relative arrangements described in the following embodiment are merely explanatory examples, and are not intended to limit the scope of the present invention solely thereto unless otherwise specified.

An embodiment of the present invention is described below in detail.

A. Paper Sheet Transport System According to First Invention

A basic configuration and an operation of a paper sheet transport system according to a first invention are explained below.

The paper sheet transport system is installed on each of game hall facilities in a game hall where various types of game machines such as pachinko machines or pachislot (pachinko-slot) machines are installed. Although banknotes are mainly explained as an example of paper sheets in the following embodiment, the present invention is also applicable to paper sheets (sheets) other than the banknotes, including securities such as cash vouchers or gift certificates, cards, and the like.

Although not particularly illustrated or explained, the paper sheet transport system according to the present invention is also applied to a banknote transport system or a banknote transport device in casinos.

[Schematic Configuration of Game Hall Facilities]

FIG. 1 is a perspective view illustrating a schematic configuration of game hall facilities including a plurality of game machines.

Game machines 1 are installed on game hall facilities L (L1, L2, . . . ) and eight game machines 1 are arranged back to back on each of two opposing side surfaces of each of the game hall facilities L, that is, a total of 16 game machines 1 are arranged back to back. An aisle on which players or clerks of the game hall walk is provided between the game hall facilities L and a chair (not illustrated) is provided for each of the game machines 1 on the aisles.

A sandwiched machine 2 is installed for each of the game machines 1 on the game hall facilities L. The sandwiched machine 2 includes a banknote inlet (a banknote input part) that receives input banknotes, a game media dispensing device that dispenses a number of pachinko balls corresponding to the money amount of input banknotes, and the like. A banknote transport system 10 that transports banknotes inserted through the sandwiched machines 2 to a cashbox unit 700 placed at one end portion of the associated game hall facility L is installed in each of the game hall facilities L illustrated in FIG. 1.

Figure 2:
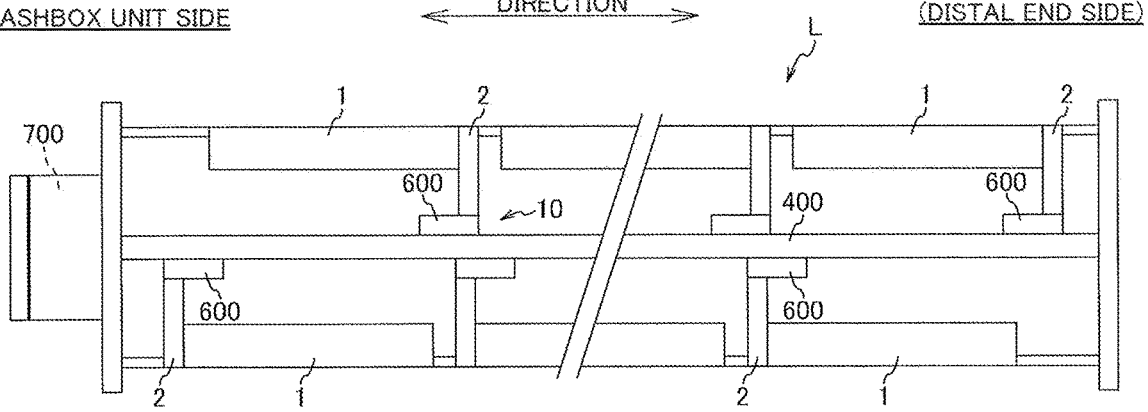
FIG. 2 is a plan view illustrating a schematic configuration of the game hall facility including a plurality of the game machines.

FIG. 2 is a plan view illustrating a schematic configuration of the game hall facility including a plurality of the game machines.

The banknote transport system 10 installed in each of the game hall facilities L includes receiving units (banknote receiving devices) 600 that each receive banknotes inserted from the banknote inlet of the associated sandwiched machine 2 therein, a transport tube 400 that extends in a longitudinal direction of the game hall facility L (an array direction of the game machines 1) and that transports the banknotes received by the receiving units 600, the cashbox unit 700 that is arranged at one end of the transport tube 400, and the like.

[Schematic Configuration of Banknote Transport System]

<Overall Outline>

Figure 3:
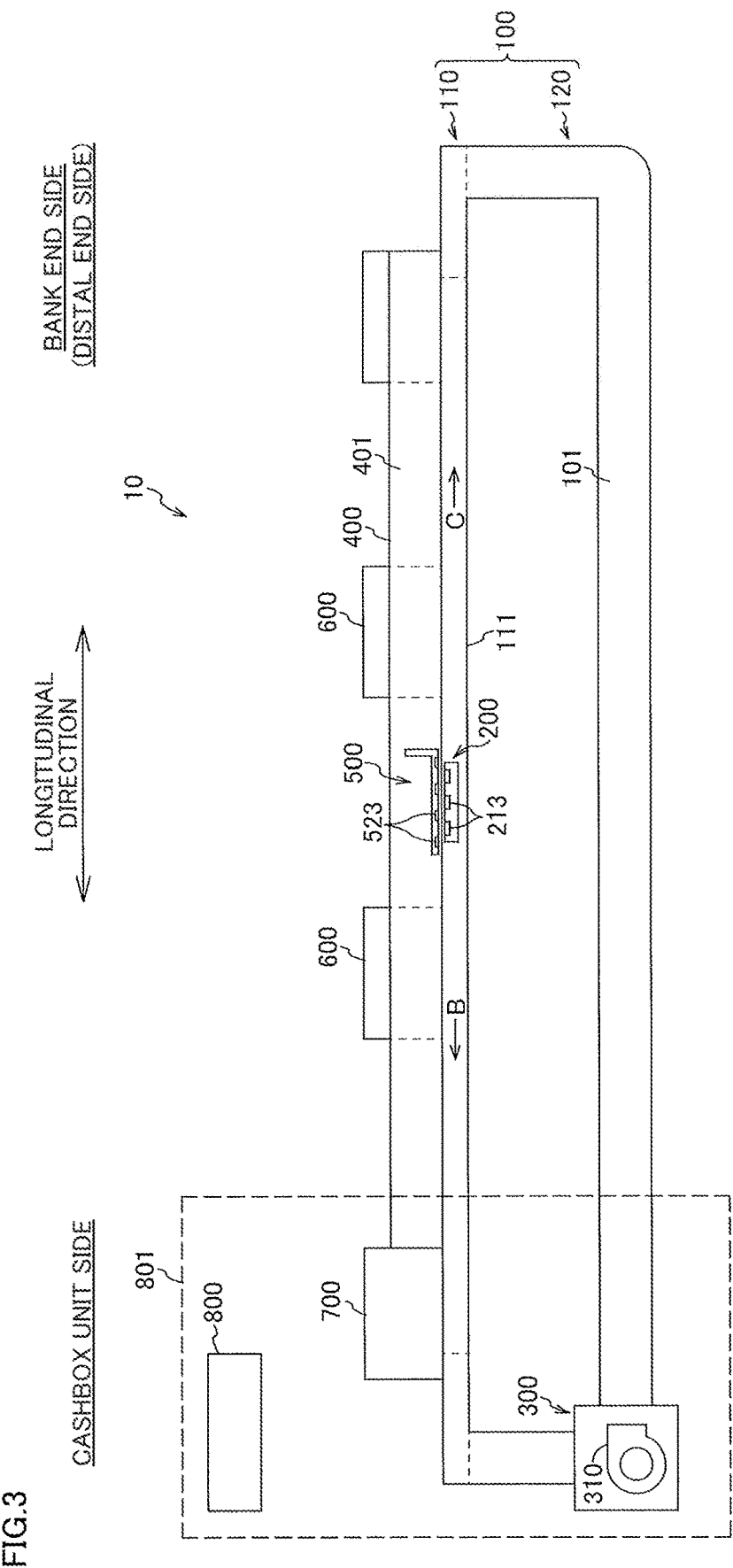
FIG. 3 is a schematic diagram illustrating a schematic configuration of a banknote transport system according to a first invention.

FIG. 3 is a schematic diagram illustrating a schematic configuration of the banknote transport system. The banknote transport system (paper sheet transport mechanism) 10 according to one embodiment of the first invention is characterized in transporting banknotes using an air flow and a magnetic force.

The banknote transport system 10 includes an air blowing tube 100 that forms a flow path (an air flow path 101) of a gas, a moving body 200 that travels (moves) inside the air blowing tube 100 while receiving an air flow flowing in a predetermined direction within the air blowing tube 100, an air-blow control unit 300 that controls the air flow flowing inside the air blowing tube 100, the transport tube 400 (a transport path 401) that has at least a portion arranged along the air blowing tube 100 to be adjacent to the air blowing tube 100, and a transport body 500 that is configured to be able to retain banknotes (paper sheets) and that travels (moves) inside the transport tube 400. The transport tube 400 forms the transport path 401 (a banknote (paper sheet) transport route or a transport space) for banknotes.

The moving body 200 includes a moving body magnetic material (moving body magnets 213), and the transport body 500 includes a transport body magnetic material (transport body magnets 523). At least one of the moving body magnetic material and the transport body magnetic material is formed of a magnet (a permanent magnet or an electromagnet).

The banknote transport system 10 includes the receiving units 600 that receive banknotes input from outside and keep the banknotes at predetermined locations in the transport tube 400, respectively, the cashbox unit 700 that includes a banknote accommodating part that accommodates therein banknotes transported by the transport body 500, and a management unit (control means) 800 that controls the components constituting the banknote transport system 10.

In the present example, the air-blow control unit 300 and the cashbox unit 700 are accommodated in a housing 801 that has the management unit 800 housed therein.

The banknote transport system 10 is characterized in moving the moving body 200 arranged in the air blowing tube 100 back and forth in the longitudinal direction of the air blowing tube 100 with the air flow flowing inside the air blowing tube 100, and in moving the transport body 500 arranged in the transport tube 400 along the longitudinal direction of the air blowing tube 100 with a magnetic force acting between the transport body 500 and the moving body 200. That is, the banknote transport system 10 is characterized in moving the transport body 500 in conjunction with movement of the moving body 200 receiving the air flow due to attraction and/or repulsion based on a magnetic force acting between the moving body magnets 213 and the transport body magnets 523.

<Outline of Components>

The air blowing tube 100 includes a moving route part 111 in at least a portion in the longitudinal direction, on which the moving body 200 travels along the longitudinal direction of the air blowing tube 100. The moving route part 111 is arranged in parallel to (side by side with) and adjacently to the transport tube 400.

The moving body 200 moves inside the air blowing tube 100 while receiving an air flow flowing in a predetermined direction within the air blowing tube 100. The moving body magnets 213 mounted on the moving body 200 provide a repelling action and/or an attracting action due to a magnetic force to the transport body 500. The moving body 200 moves the moving body 200 in conjunction with its own movement due to the magnetic force.

The air-blow control unit 300 includes a blower (an air flow generating device) 310 that generates (produces) an air flow in a predetermined direction inside the air blowing tube 100 and that can change the flow volume and the flow speed of the air flow. The air-blow control unit 300 alternately generates an air flow in a first direction (a banknote collecting direction and an arrow-B direction) and an air flow in a second direction (a transport body returning direction and an arrow-C direction) being an opposite direction to the first direction inside the air blowing tube 100 to reciprocate the moving body 200 inside the air blowing tube 100.

The transport tube 400 forms a space through which banknotes and the transport body 500 move.

The transport body 500 receives the banknotes kept at the predetermined locations in the transport path 401 to retain the banknotes in an upright state, and moves inside the transport path 401 to transport the banknotes to the cashbox unit 700. The transport body magnets 523 mounted on the transport body 500 are subjected to the attracting action and/or the repelling action due to the magnetic force from the moving body magnets 213 included in the moving body 200. The transport body 500 moves inside the transport tube 400 in conjunction with the movement of the moving body 200 receiving the air flow.

When only the attracting force is to be applied between the moving body 200 and the transport body 500, both the magnetic materials mounted on the moving body 200 and the transport body 500 can be magnets, or one of the magnetic materials of the moving body 200 and the transport body 500 may be magnets and the other one may be a magnetic material such as iron. When only the repelling force is to be applied between the moving body 200 and the transport body 500, both the magnetic materials mounted on the moving body 200 and the transport body 500 are formed of magnets.

The receiving unit (a banknote receiving device) 600 receives banknotes inserted from the banknote inlet (a banknote inserting part) of the associated sandwiched machine 2 therein and keeps the banknotes at a predetermined location in the transport path 401. The receiving unit 600 is provided for each of the sandwiched machines 2. A plurality of the receiving units 600 are installed in the longitudinal direction of the transport tube 400 at a predetermined interval.

The cashbox unit 700 includes a banknote accommodating part that accommodates therein banknotes transported by the transport body 500, a drive mechanism that drives members related to accommodation of the banknotes in the banknote accommodating part, and the like.

The management unit (control means) 800 controls operations of the components constituting the banknote transport system 10. The management unit 800 is configured to include a general computer device that includes a CPU (Central Processing Unit), a ROM (Read Only Memory), a RAM (Random Access Memory), and the like and in which these units are connected via a bus. The CPU is an arithmetic unit that controls the entire banknote transport system 10. The ROM is a nonvolatile memory that has a control program to be executed by the CPU, data, and the like stored therein. The RAM is a volatile memory to be used as a work area for the CPU. The CPU reads the control program stored in the ROM to load the control program into the RAM and execute the control program, so that various functions are realized.

[Detailed Configuration of Banknote Transport System]

Detailed configurations of the components of the banknote transport system according to the embodiment of the first invention are explained.

<Air Blowing Tube>

The air blowing tube is explained with reference to FIGS. 3 and 4.

Figure 4:
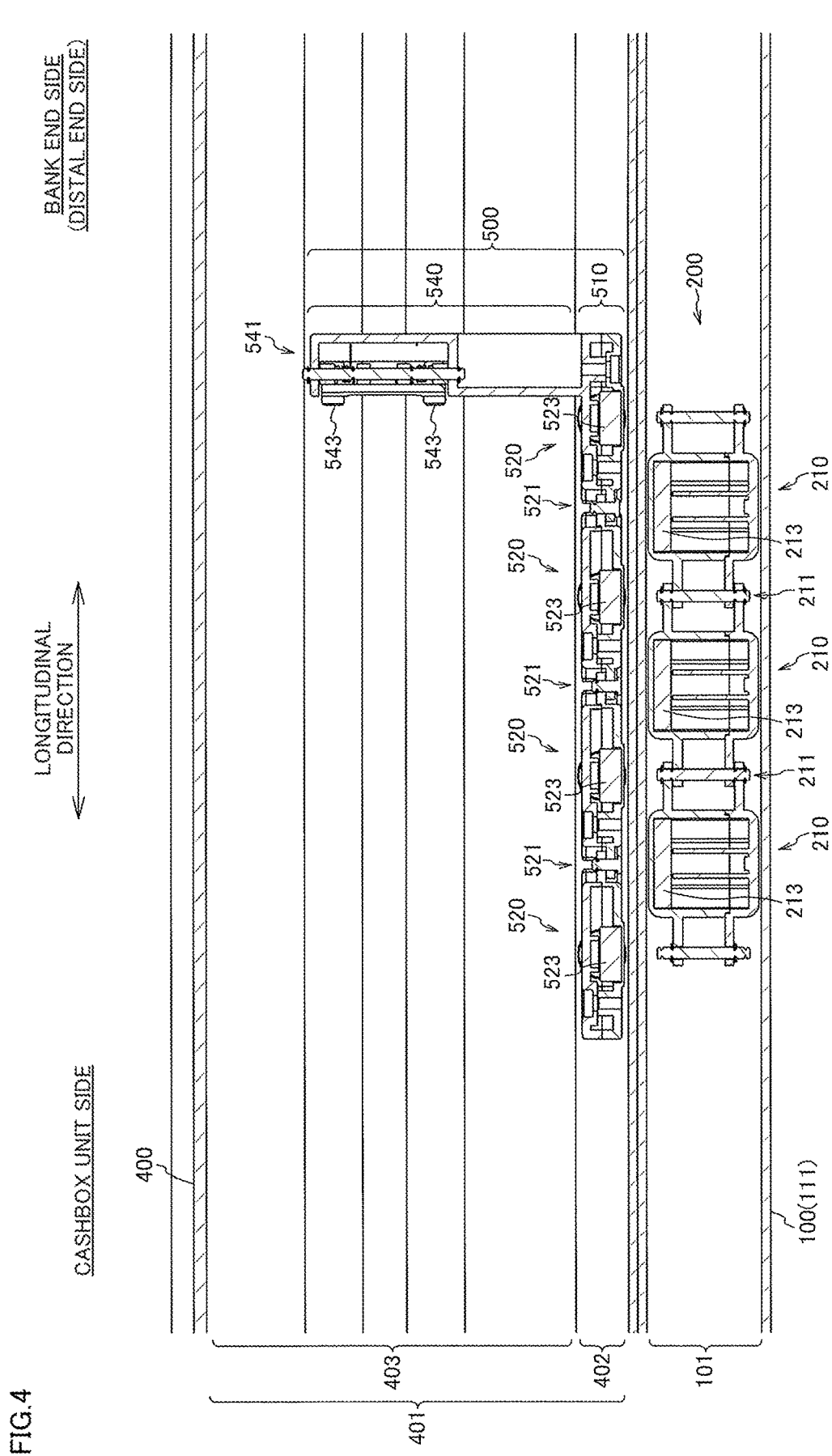
FIG. 4 is a vertical sectional view of a moving body, an air blowing tube including the moving body, a transport body, and a transport tube including the transport body in a case in which the moving body and the transport body repel each other due to a magnetic force.

FIG. 4 is a vertical sectional view of the moving body, the air blowing tube including the moving body, the transport body, and the transport tube including the transport body in a case in which the moving body and the transport body repel each other due to a magnetic force.

The air blowing tube 100 illustrated in FIG. 3 includes a first air blowing tube 110 including the moving route part 111, and a second air blowing tube 120 forming the air flow path 101 in an endless manner with the first air blowing tube 110 through a switching valve 325 (see FIG. 5), which will be described later.

Since the banknote transport system 10 moves the transport body 500 using a magnetic force, the moving route part 111 of the air blowing tube 100 includes a configuration that does not affect the travel of the moving body 200 and the travel of the transport body 500 based on the magnetic force. While it is desirable that the moving route part 111 is entirely formed of a non-magnetic material, the moving route part 111 may include a magnetic material in a portion within a range that does not affect the travel of the moving body 200 and the transport body 500.

The moving route part 111 includes a configuration (the thickness of the tube, the spacing between the tubes, the shape thereof, and the like) that can apply a magnetic force between the moving body 200 arranged inside the moving route part 111 and the transport body 500 arranged inside the transport tube 400.

With the configuration of the air blowing tube 100 separate from and independent of the transport tube 400, an airtight flow path can be formed in the air blowing tube 100. Reduction in the transport force of the moving body 200 due to air leakage to outside of the air blowing tube 100 can be prevented. Furthermore, the blower 310 being relatively inexpensive and outputting low power can be adopted as a blower to be used to generate an air flow and reduction in the cost of the banknote transport system 10 can be realized. The air flow inside the air blowing tube 100 can be reliably controlled even when the air blowing tube 100 is elongated with an increase in the banknote transport distance. Since the moving body 200 is caused to travel with the air flow, the need to arrange a mechanical configuration such as a gear or a transport belt, lines, or electrical contacts inside the air blowing tube 100 is eliminated and the durability of the air blowing tube 100 and the moving body 200 arranged therein is increased. Furthermore, external air does not flow in the air flow path 101 airtightly configured, so that grit and dust in the external air are not drawn therein and the inside of the air flow path 101 can be kept clean.

<Moving Body>

It suffices that the moving body 200 has a shape and a configuration that enable movement in the air blowing tube 100 by being subjected to an air pressure.

As illustrated in FIG. 4, the moving body 200 has a configuration in which a plurality of divided pieces 210, 210, . . . are sequentially coupled to each other with hinge parts 211 along a travel direction of the moving body 200 (the longitudinal direction of the air blowing tube 100). The divided pieces 210 illustrated in the present example have same configurations and each of the divided pieces 210 has the moving body magnet 213.

The moving body 200 includes the moving body magnets 213 respectively arranged at locations, in attitudes, and in shapes that enable to apply a magnetic force to the transport body 500. In the present example, the moving body magnets 213 are arranged on a side of the moving body 200 nearer the transport tube 400. The moving body magnets 213 included in the moving body 200 are arranged spaced apart from each other in the travel direction of the moving body 200. In the present example, each of the moving body magnets 213 is attached to the associated divided piece 210 in such a manner that the N pole (one of the poles) faces the side of the transport tube 400 (the upper side in FIG. 4) and the S pole (the other pole) faces the lower side in FIG. 4.

The moving body 200 illustrated in the present example is constituted of three divided pieces 210. The divided pieces 210 are coupled to each other to be angularly displaceable within a predetermined range in the upper-lower direction in FIG. 4 and the depth direction of the plane of the paper centering on the hinge parts 211, respectively. With this configuration, the moving body 200 can smoothly move in the air blowing tube 100 while the divided pieces 210 displace even when the air blowing tube 100 forms the air flow path 101 curved in the upper-lower or right-left direction.

<Relation Between Air Blowing Tube and Moving Body>

The inner surface shape of the moving route part 111 and the outer surface shape (structure) of the moving body 200 are formed in such a manner that the moving body 200 does not relatively rotate on a virtual axis extending along the longitudinal direction of the moving route part 111 with respect to the moving route part 111. For example, the horizontal sectional shape (the shape on a cross section orthogonal to the longitudinal direction) of the moving route part 111 and the horizontal sectional shape of the divided pieces 210 of the moving body 200 are respectively formed into rectangular shapes. With provision of the configuration described above, the attitude of the moving body 200 in the moving route part 111 can be maintained to cause the N pole (one of the poles) of each of the moving body magnets 213 to always face the side of the transport tube 400.

<Air-Blow Control Unit>

FIGS. 5A to 5C are schematic diagrams illustrating a relation between the air blowing tube and the air-blow control unit according to one embodiment of the first invention.

The air-blow control unit 300 according to the present embodiment includes a single blower 310 that generates an air flow flowing in a certain direction, and a switching unit 320 (the switching valve 325) that controls the direction of the air flow in the air blowing tube 100. The air-blow control unit 300 is characterized in switching the direction of the air flow in the air blowing tube 100 between the first direction (the banknote collecting direction and the arrow-B direction) and the second direction (the moving body returning direction and the arrow-C direction) opposite to the first direction using the switching unit 320.

The air-blow control unit (an air-flow control device) 300 includes the switching unit (an air flow switching unit) 320 that controls the discharge direction of the air flow, a first circulation pipe 330 that forms an endless air flow path through the switching unit 320, and the blower 310 that is arranged at an appropriate place in the first circulation pipe 330 to generate an air flow flowing in a certain direction inside the first circulation pipe.

The switching unit 320 includes a casing 321 in which four flow paths 323 (a first flow path 323a to a fourth flow path 323d: ports) respectively connecting to external pipes are formed, and the switching valve 325 that is arranged in a joint portion (an intersecting portion) of the four flow paths 323 to switch the communication state among the flow paths 323 and/or the opening degrees at the time of communication. The flow paths 323 are communicated with and connected to an air discharge tube 331, an air intake tube 333, the first air blowing tube 110, and the second air blowing tube 120 that are external pipes, respectively. In the present example, the flow paths 323 are arranged in a cross manner (a radial manner). The switching valve 325 illustrated in the present example is a rotary valve such as a ball valve and the switching valve 325 rotates in the casing 321 by a predetermined angle, whereby the communication states of the flow paths 323 and the opening degrees of the flow paths 323 are switched.

The switching valve 325 is an electric-operated valve and is driven by a motor to control the rotation angle. For example, a stepping motor can be used as the motor. The switching valve 325 is, for example, controlled to have a desired rotation angle by the management unit 800 that controls the rotation angle of the stepping motor on the basis of a drive pulse. Of course, other methods may be used for driving means for rotating the switching valve 325 and control of the rotation angle of the switching valve 325. For example, a configuration in which a rotary encoder that rotates in conjunction with the switching valve 325, and a sensor that detects the rotation angle of the rotary encoder are mounted on the switching unit 320 and in which the management unit 800 executes feedback control of the rotation angle of the switching valve 325 may be adopted.

The first circulation pipe 330 includes the air discharge tube 331 that has one end portion (one end portion 330a of the first circulation pipe 330) communicatively connected to the first flow path 323a of the switching unit 320 and the other end portion communicatively connected to the outlet of the blower 310, and the air intake tube 333 that has one end portion communicatively connected to the inlet of the blower 310 and the other end portion (the other end portion 330b of the first circulation pipe 330) communicatively connected to the second flow path 323b of the switching unit 320.

The air blowing tube (second circulation pipe) 100 has one end portion 100a communicatively connected to the third flow path 323c of the switching unit 320 and the other end portion 100b communicatively connected to the fourth flow path 323d of the switching unit 320, and forms an endless air flow path through the switching unit 320. The air blowing tube 100 reciprocates the moving body 200 placed therein in the arrow-B direction and the arrow-C direction in FIG. 5 with the air flow.

The air blowing tube 100 according to the present example includes the first air blowing tube 110 forming the moving route part 111 of the moving body 200, and the second air blowing tube 120 communicatively connected to the first air blowing tube 110. The first air blowing tube 110 is communicatively connected to the third flow path 323c and the second air blowing tube 120 is communicatively connected to the fourth flow path 323d.

<<Operation of Switching Unit: Neutral State>>

FIG. 5A illustrates a neutral state.

The switching valve 325 is in a neutral position for establishing communication between the first flow path 323a and the second flow path 323b while not establishing communication between the first and second flow paths 323a and 323b and the third and fourth flow paths 323c and 323d.

Accordingly, the air flow circulates in the first circulation pipe 330 in an arrow-A (A1 and A2) direction and no air flow is generated inside the air blowing tube 100. Therefore, the moving body 200 is in a state stopped in the air blowing tube 100.

<<Operation of Switching Unit: First Communication State>>

FIG. 5B illustrates a first state in which an air flow flowing in the first direction (an arrow-B1 or B2 direction) is generated inside the air blowing tube 100. This state is, for example, a banknote collecting operation state for transporting banknotes collected by the transport body 500 to the cashbox unit 700.

The switching valve 325 is in a first communication position for establishing communication between the first flow path 323a and the fourth flow path 323d and establishing communication between the second flow path 323b and the third flow path 323c. At this time, the first flow path 323a and the fourth flow path 323d are not communicated with the second flow path 323b and the third flow path 323c.

The air circulates in an endless manner between the first circulation pipe 330 and the air blowing tube 100. That is, air (in the arrow-A1 direction) discharged from the discharge tube 331 to flow in the first flow path 323a flows in the second air blowing tube 120 from the fourth flow path 323d (in the arrow-B1 direction) due to the switching valve 325. Air flowing in the arrow-B2 direction inside the first air blowing tube 110 to flow in the third flow path 323c flows in the intake tube 333 from the second flow path 323b (in the arrow-A2 direction) due to the switching valve 325, returns to the blower 310, and is discharged again from the discharge tube 331.

<<Operation of Switching Unit: Second Communication State>>

FIG. 5C illustrates a second state in which an air flow flowing in the second direction (an arrow-C1 or C2 direction) is generated inside the air blowing tube 100. This state is, for example, a return operation state for returning the transport body 500 from the side of the cashbox unit 700 (the side of the management unit 800) to the distal end side of the transport tube 400.

The switching valve 325 is in a second communication position for establishing communication between the first flow path 323a and the third flow path 323c and establishing communication between the second flow path 323b and the fourth flow path 323d. At this time, the first flow path 323a and the third flow path 323c are not communicated with the second flow path 323b and the fourth flow path 323d.

The air circulates in an endless manner between the first circulation pipe 330 and the air blowing tube 100. That is, air (in the arrow-A1 direction) discharged from the discharge tube 331 to flow in the first flow path 323a flows in the first air blowing tube 110 from the third flow path 323c (the arrow-C1 direction) due to the switching valve 325. Air flowing in the arrow-C2 direction inside the second air blowing tube 120 to flow in the fourth flow path 323d flows in the intake tube 333 from the second flow path 323b (in the arrow-A2 direction) due to the switching valve 325, returns to the blower 310, and is discharged again from the discharge tube 331.

<<Operation of Switching Unit: Summary>>

By connecting two endless pipes (the first circulation pipe 330 and the air blowing tube 100) via the switching unit 320 as described above, three states including the neutral state in which no air flow is generated in the air blowing tube 100, the first communication state in which an air flow flowing in the first direction (the arrow-B direction) is generated inside the air blowing tube 100, and the second communication state in which an air flow flowing in the second direction (the arrow-C direction) is generated inside the air blowing tube 100 can be changed by changing the position of the switching valve 325 while an air flow in a certain direction (the arrow-A direction) is generated by the single blower 310.

In intermediate positions taken by the switching valve 325 among the three positions described above, the communication state changes from those in the three states. That is, since the communication relation among the flow paths and the opening degrees of the flow paths can be adjusted according to the angle of the switching valve 325 in the casing 321 in the present embodiment, an air volume of the air flow according to the opening degrees of the flow paths can be generated inside the air blowing tube 100. That is, the speed of the moving body 200 can be varied according to the wind speed in the air blowing tube 100.

The moving speed of the moving body 200 may be adjusted by control of the air volume of the blower 310. For example, the air volume of the blower 310 may be adjusted by varying the rotational speed of blades of the blower 310 by PWM (Pulse Width Modulation) control. However, since the rotation responsiveness of the switching valve 325 is higher than the variation responsiveness of the rotational speed of the blower 310, adjustment of the rotation angle of the switching valve 325 is more advantageous to rapidly adjust the speed of the moving body 200.

<Transport Tube>

The transport tube (the transport route) 400 is explained with reference to FIGS. 4 and 6.

Figure 6:
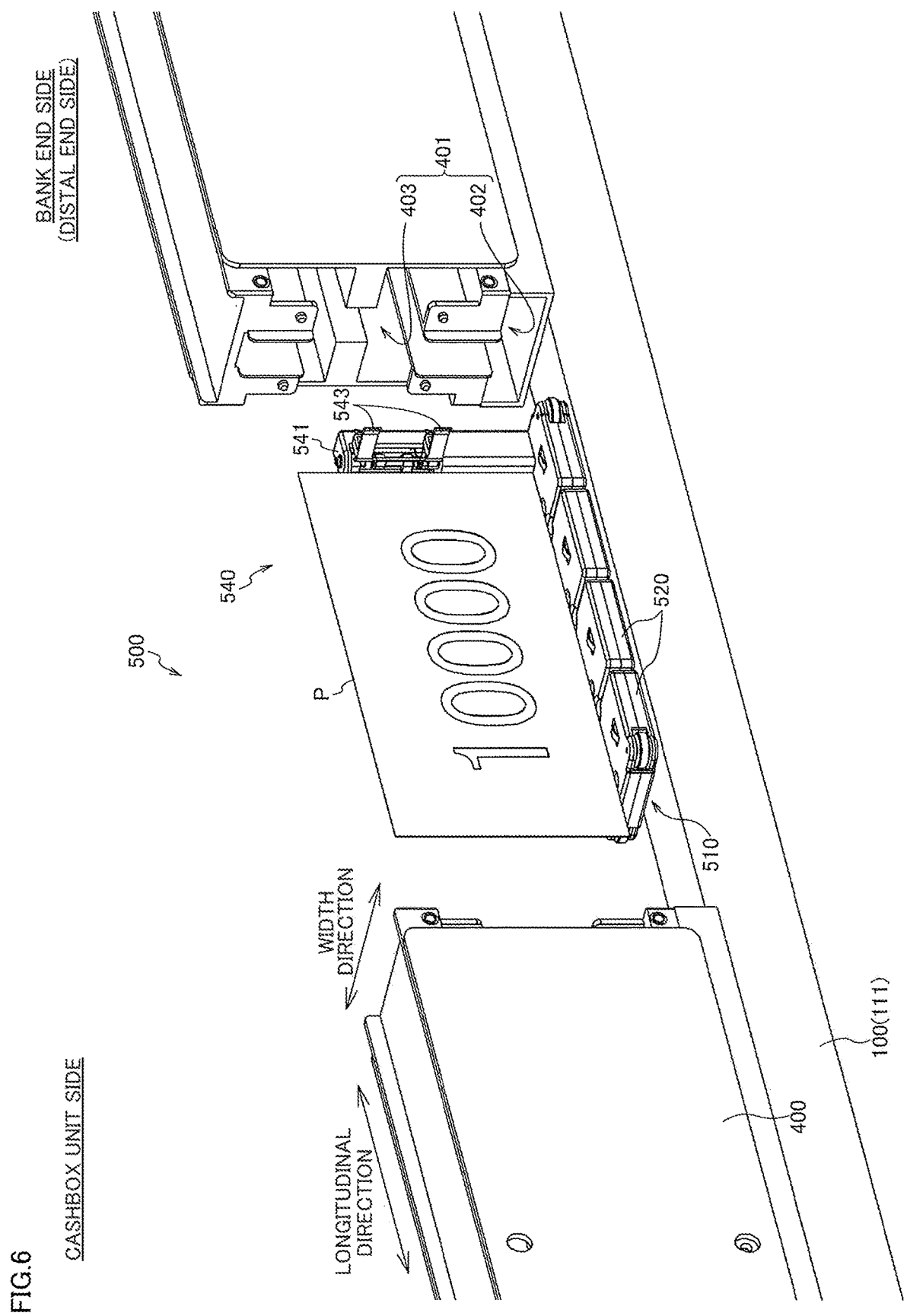
FIG. 6 is a perspective view illustrating a relation between the transport tube and the transport body.

FIG. 6 is a perspective view illustrating a relation between the transport tube and the transport body. FIG. 6 illustrates a state in which the inner part of the transport tube 400 is partially exposed.

Since the transport body 500 is transported with a magnetic force in the banknote transport system 10, the transport tube 400 is formed of a material that does not affect the travel of the transport body 500 based on the magnetic force. Although it is desirable that the transport tube 400 is entirely formed of a non-magnetic material, the transport tube 400 may include a magnetic material in a part thereof without affecting the travel of the transport body 500.

The transport tube 400 includes a configuration (the thickness of the tube, the spacing between tubes, the shape thereof, and the like) that can apply a magnetic force between the moving body 200 arranged inside the moving route part 111 and the transport body 500 arranged inside the transport tube 400.

Although the transport tube 400 is arranged above the air blowing tube 100 in the present example, the location relation between the air blowing tube 100 and the transport tube 400 is not limited thereto. The transport tube 400 may be arranged below the air blowing tube 100 or the transport tube 400 may be arranged on the lateral side of the air blowing tube 100.

While the transport tube 400 is illustrated as means that constitutes the transport path 401 in the present example, the means that constitutes the transport path 401 does not need to be tubular and the present invention can be achieved even with a configuration in which a part or the whole of the transport path 401 is open to outside. That is, the transport tube 400 can have any form when it can form an elongated space as the transport path 401 therein.

<Transport Body>

As illustrated in FIGS. 4 and 6, the transport body 500 includes a transport base 510 that is arranged on the side nearer the air blowing tube 100 in the transport path 401 and that is subjected to a magnetic force from the moving body 200, and a banknote collecting/retaining part 540 provided on the opposite side of the transport base 510 to the air blowing tube 100.

<<Transport Base>>

The transport base 510 has a configuration in which a plurality of divided pieces 520, 520, . . . are sequentially coupled to each other with hinge parts 521 along the travel direction of the transport body 500 (the longitudinal direction of the transport tube 400). Each of the divided pieces 520 illustrated in the present example includes the transport body magnet 523.

The transport base 510 includes the transport body magnets 523 arranged at locations, in attitudes, and in shapes that can be subjected to the effect of the magnetic force from the moving body 200. In the present example, the transport body magnets 523 are arranged on the side of the transport base 510 nearer the air blowing tube 100. The transport body magnets 523 included in the transport base 510 are arranged spaced apart from each other in the travel direction of the transport body 500. In the present example, each of the transport body magnets 523 is attached to the associated divided piece 520 in such a manner that the N pole (one of the poles) faces the side of the air blowing tube 100 (the lower side in FIGS. 4 and 6) and the S pole (the other pole) faces the upper side in FIGS. 4 and 6. The transport base 510 magnetically levitates in the transport tube 400 under a repelling force due to the magnetic force from the moving body 200.

The transport base 510 illustrated in the present example is constituted of four divided pieces 520. The divided pieces 520 are coupled to each other to be angularly displaceable within a predetermined range in the upper-lower direction in FIGS. 4 and 6 and the depth direction of the plane of paper centering on the hinge parts 521, respectively. With the configuration described above, the transport body 500 can smoothly move in the transport tube 400 even when the transport tube 400 forms the transport path 401 curved in the upper-lower or right-left direction.

<<Banknote Collecting/Retaining Part>>

The banknote collecting/retaining part 540 is arranged on the transport base 510. The banknote collecting/retaining part 540 includes a support member 541 that is upright in a direction away from the air blowing tube 100, and collecting members (collecting pawls) 544 that are protruded from the support member 541 in the width direction at an end portion on the bank end side in the longitudinal direction of the transport tube 400 (on the distal end side with respect to the cashbox unit 700). The support member 541 is protruded upward from a middle portion of the transport base 510 in the width direction.

The banknote collecting/retaining part 540 retains banknotes (paper sheets) P to cause the long edge direction of the banknotes P to follow the longitudinal direction of the transport tube 400 and in an upright attitude. One of long sides (a long side positioned on the lower side in FIG. 6) of the banknote P is supported by the transport base 510. The rear end edge (one of short sides) of the banknote is supported by the support member 541 or the collecting pawls 544.

<Relation Between Transport Tube and Transport Body>

The transport tube 400 includes therein a base transport path 402 arranged on the side nearer the air blowing tube 100, and a banknote transport path 403 arranged on the opposite side to the air blowing tube 100. The base transport path 402 is a horizontally-long space where the transport base 510 of the transport body 500 travels, and the banknote transport path 403 is a vertically-long space where the banknote collecting/retaining part 540 of the transport body 500 and banknotes retained by the banknote collecting/retaining part 540 travel.

Since the transport body 500 illustrated in the present example travels while being subjected to a repelling force due to a magnetic force from the moving body 200, the base transport path 402 and the transport base 510 are configured to inhibit separation (movement toward the banknote transport path 403) of the transport base 510 from the base transport path 402 and to maintain the transport base 510 at a location where the effect of the magnetic force can be received from the moving body 200.

The inner surface shape of the base transport path 402 and the outer surface shape of the transport base 510 are formed in such a manner that the transport base 510 does not relatively rotate on a virtual axis extending along the longitudinal direction of the base transport path 402 with respect to the base transport path 402. For example, the horizontal sectional shape of the base transport path 402 and the horizontal sectional shape of the transport base 510 are formed in rectangular shapes. With provision of the configuration described above, the attitude of the moving body 200 in the base transport path 402 is maintained to cause the N pole (one of the poles) of each of the transport body magnets 523 to always face the side of the air blowing tube 100.

<Relation Between Moving Body and Transport Body>

A relation between the moving body magnetic material and the transport body magnetic material is explained.

<<Only Repulsion>>

As illustrated in FIG. 4, one or more magnets can be arranged in both the moving body 200 and the transport body 500 in directions repelling each other to apply only the repelling force between the moving body 200 and the transport body 500. When only the repelling force is to be applied between the moving body 200 and the transport body 500, it is desirable that a plurality of magnets are arranged on at least one of the moving body 200 and the transport body 500 at a predetermined interval in the travel direction. With arrangement of the magnets in the travel direction on at least one of the moving body 200 and the transport body 500, the moving body magnets 213 and the transport body magnets 523 are alternately arrayed when the moving body 500 travels while being subjected to the repelling force from the moving body 200. That is, when the transport body 500 travels, the transport body 500 is relatively positioned with respect to the moving body 200. In this case, it is particularly preferable that the difference between the number of magnets included in the moving body 200 and the number of magnets included in the transport body 500 is one. In other words, when n is a natural number, it is preferable that n magnets are arranged on one of the moving body 200 and the transport body 500 and that n+1 magnets are arranged on the other one.

When the transport tube 400 is placed above the air blowing tube 100 and a repelling force is applied between the transport body 500 and the moving body 200, the transport body 500 levitates in the transport tube 400 and therefore the transport body 500 is less likely to be in contact with the transport tube 400. Accordingly, it is possible to prevent reduction in the transport force of the transport body 500 due to friction with the transport tube 400 and smoothly move the transport body 500. Since the contact between the transport body 500 and the transport tube 400 is suppressed, generation of fine dust (powdery dust) due to contact between members can be prevented.

When the repelling force is applied between the moving body 200 and the transport body 500, the transport force can be increased by increasing the number of magnets included in the moving body 200 and the transport body 500.

<<Only Attraction>>

Figure 7:
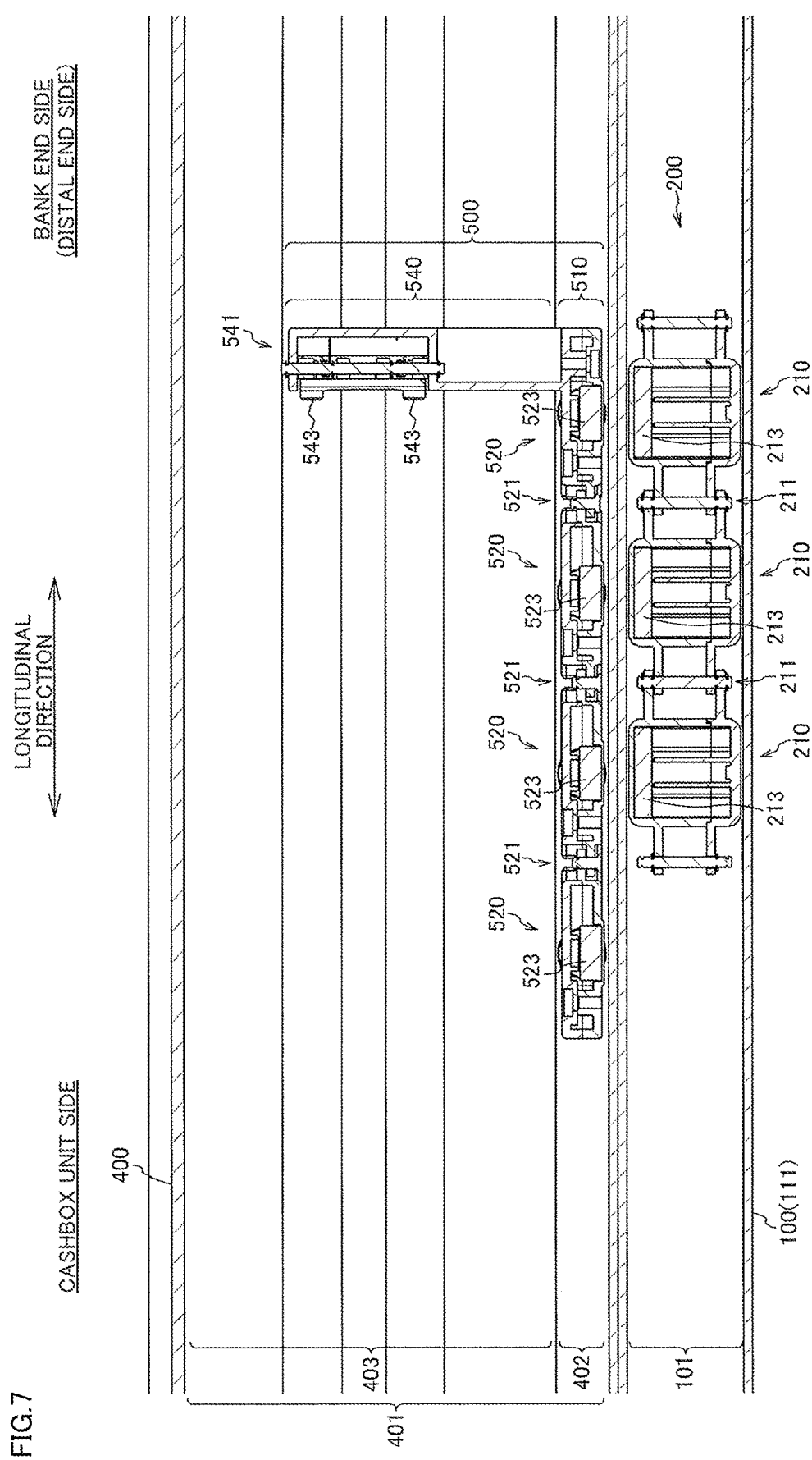
FIG. 7 is a vertical sectional view of the moving body, the air blowing tube including the moving body, the transport body, and the transport tube including the transport body in a case in which the moving body and the transport body attract each other due to a magnetic force.

FIG. 7 is a vertical sectional view of the air blowing tube and the transport tube including the moving body and the transport body in a case in which the moving body and the transport body attract each other due to a magnetic force.

In an illustrated example, the moving body magnets 213 and the transport body magnets 523 are respectively attached to the moving body 200 and the transport body 500 in attitudes attracting each other. Since the locations in the longitudinal direction of the moving body magnets 213 and the transport body magnets 523 match each other with walls of the air blowing tube 100 and the transport tube 400 interposed therebetween, positioning of the transport body 500 with respect to the moving body 200 is easy.

When only the attracting force based on the magnetic force is to be applied between the moving body 200 and the transport body 500, it suffices that at least either the magnetic material mounted on the moving body 200 or the magnetic material mounted on the transport body 500 is a magnet. For example, magnets may be arranged on one of the transport body 500 and the moving body 200 and a magnetic material (for example, iron plates), other than magnets, that is attracted by magnets may be arranged on the other one.

When only the attracting force based on the magnetic force is to be applied between the moving body 200 and the transport body 500, it suffices that at least one set of magnetic materials (for example, a set of a magnet and a magnet or a set of a magnet and an iron plate) is arranged on the transport body 500 and the moving body 200.

<<Repulsion and Attraction>>

Both the repelling force and the attracting force may be applied between the moving body 200 and the transport body 500. That is, a set of magnets that apply a repelling force to each other, and a set of magnets that apply an attracting force to each other may be mixed on the moving body 200 and the transport body 500. An example in which both the repelling force and the attracting force are applied will be described later with reference to FIG. 8.

<<Orientation of Magnets>>

While the poles of each of the magnets are arranged to face in the upper-lower direction (a staking direction of the air blowing tube 100 and the transport tube 400) in the embodiment described above, the poles of each of the magnets may be arranged to face in the travel direction (for example, to cause the N pole to face toward the cashbox unit and the S pole to face toward the bank end side/the distal end side). Alternatively, the poles of each of the magnets may be arranged diagonally to the travel direction. The action of the magnetic force can be appropriately adjusted according to the orientation of the magnets.

<<Orientation of Magnets: Arrangement in Tandem>>

Figure 8:
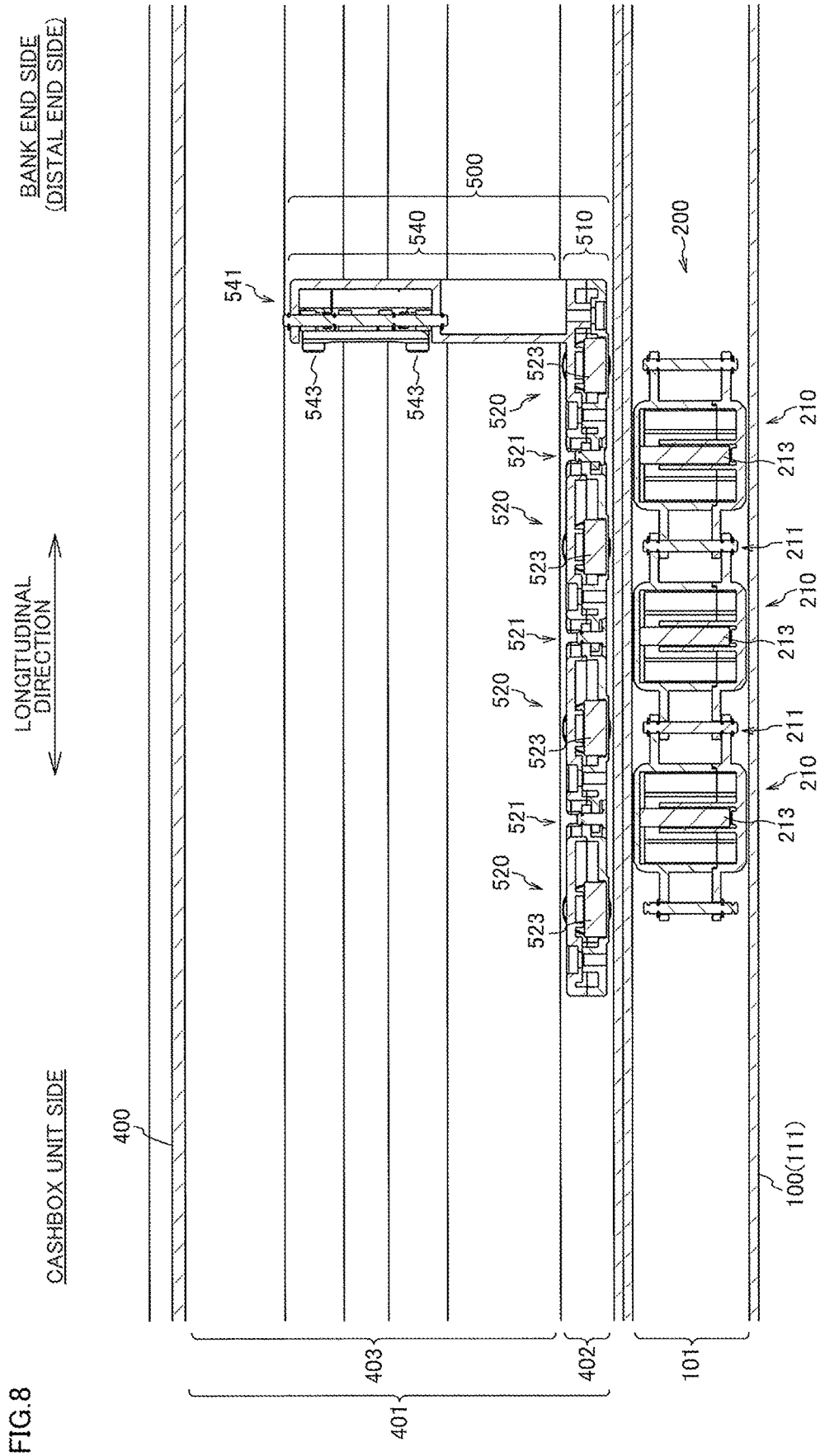
FIG. 8 is a vertical sectional view of the air blowing tube and the transport tube including the moving body and the transport body in a case in which the poles of each of moving body magnets are arranged to face in a travel direction.

FIG. 8 is a vertical sectional view of the air blowing tube and the transport tube including the moving body and the transport body in a case in which the poles of each of the moving body magnets are arranged to face in the travel direction.

In an illustrated example, each of the moving body magnets 213 is attached to the associated divided piece 210 in such a manner that the N pole (one of the poles) faces the side of the cashbox unit (the left side in FIG. 8) and the S pole (the other pole) faces the distal end side (the right side in FIG. 8). Each of the transport body magnets 523 is attached to the associated divided piece 520 in such a manner that the N pole faces the side of the air blowing tube 100 and the S pole faces the upper side in FIG. 8.

Since surfaces (the N poles) on the cashbox unit side of the moving body magnets 213 respectively repel the transport body magnets 523 (the N poles), and the surfaces (the S poles) on the distal end side of the moving body magnets 213 respectively attract the transport body magnets 523 (the N poles), both the repelling force and the attracting force can be applied between the moving body 200 and the transport body 500.

[First Modified Embodiment Related to Air Blow Control]

Figure 9:
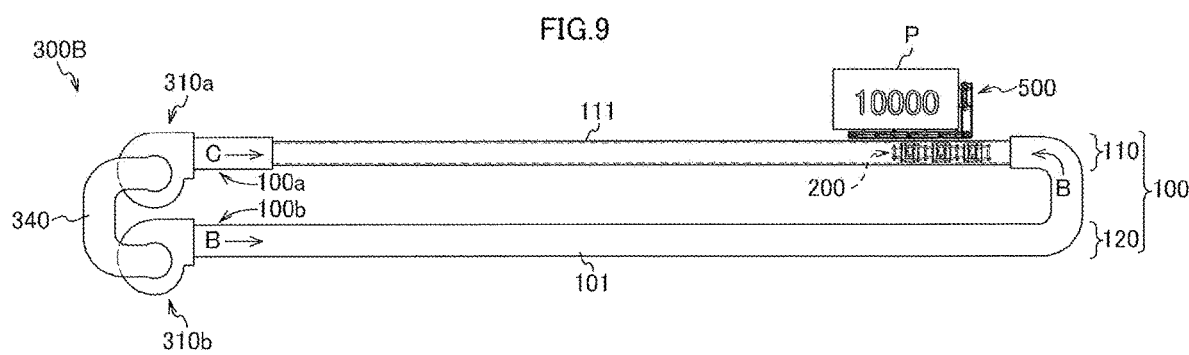
FIG. 9 is a diagram illustrating a first modification of the air-blow control unit.

FIG. 9 is a diagram illustrating a first modification of the air-blow control unit.

An air-blow control unit 300B may have a configuration including a blower 310a having an outlet connected to one end portion 100a of the air blowing tube 100, a blower 310b having an outlet connected to the other end portion 100b of the air blowing tube 100, and a connection pipe 340 that connects inlets of the blowers 310a and 310b to each other. The air blowing tube 100 (the first air blowing tube 110 and the second air blowing tube 120) is configured in an endless manner through the two blowers 310a and 310b and the connection pipe 340.

Turning on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. Air flowing inside the air blowing tube 100 flows in the outlet of the blower 310a and is discharged from the inlet of the blower 310a. The air further passes through the connection pipe 340 to return to the inlet of the blower 310b and is discharged from the outlet of the blower 310b.

When an air flow flowing in a second direction (an arrow-C direction) is to be generated inside the air blowing tube 100 (the second state and the transport body returning state), it suffices to turn one blower 310b off and turn the other blower 310a on to generate the air flow.

In this manner, the use of two blowers also enables the air flow in the first direction and the air flow in the second direction to be generated inside the air blowing tube 100.

Since the inlets of the two blowers 310a and 310b are connected with the connection pipe 340 in the present example, air can be efficiently circulated inside the air flow path 101 airtightly configured.

[Second Modified Embodiment Related to Air Blow Control]

Figure 10:
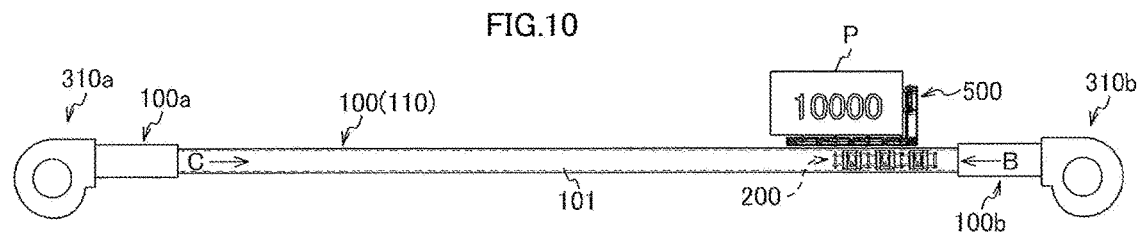
FIG. 10 is a diagram illustrating a second modification of the air-blow control unit.

FIG. 10 is a diagram illustrating a second modification of the air-blow control unit.

An air-blow control unit 300C may have a configuration including the blowers 310a and 310b at one end portion 100a and the other end portion 100b of the air blowing tube 100, respectively. Turning-on/off of the blowers 310a and 310b and the air volume thereof are controlled by the management unit 800.

When an air flow flowing in a first direction (an arrow-B direction) is to be generated inside the air blowing tube 100 (the first state and the banknote collecting operation state), one blower 310b is turned on to generate an air flow and the other blower 310a is turned off. The blower 310b takes external air to the inside from the inlet and discharges the air, thereby generating the air flow in the arrow-B direction inside the air blowing tube 100. This air flow is taken into the blower 310a from the outlet of the blower 310a and is discharged from the inlet.

When an air flow flowing in a second direction (an arrow-C direction) is to be generated inside the air blowing tube 100 (the second state and the transport body returning state), it suffices to turn one blower 310b off and turn the other blower 310a on to generate the air flow.

Since the present example does not require pipes for causing the air flow path 101 to be a circulation path, the configuration is simplified.

B. Paper Sheet Transport System According to Second Invention

<<Transport Body (Banknote Collecting Shuttle)>>

Figure 11C:
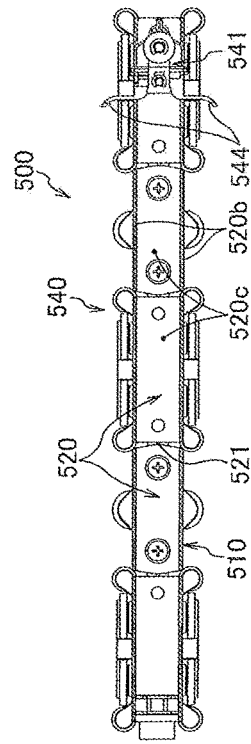
FIGS. 11A, 11B, 11C, and 11D are an exterior perspective view, a front view, a plan view, and a sectional view along A-A in FIG. 11A of a transport body 500 in a state where collecting members (collecting pawls) are opened.
Figure 11A:
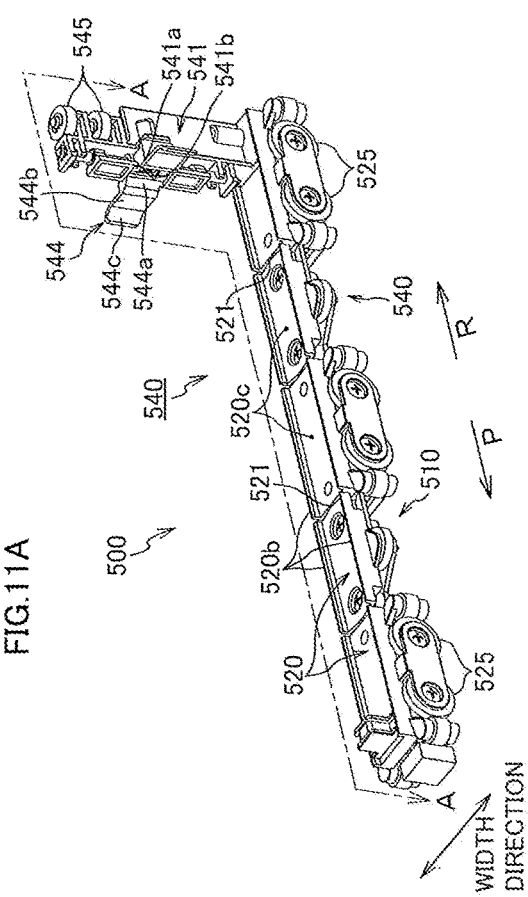

FIGS. 11A, 11B, 11C, and 11D are an exterior perspective view, a front view, a plan view, and a sectional view along A-A in FIG. 11A of the transport body 500 in a state where the collecting members (the collecting pawls) are opened. FIGS. 12A and 12B are an exterior perspective view and a plan view of the transport body 500 in a state where the collecting members (the collecting pawls) are closed. FIG. 13 is a partial sectional view illustrating a location relation between the transport tube 400 and the transport body 500.

The transport body 500 illustrated in FIGS. 11 to 13 is slightly different from the transport body illustrated in FIG. 6 in the configurations of the transport base 510 and the collecting members 544.

Figure 11D:
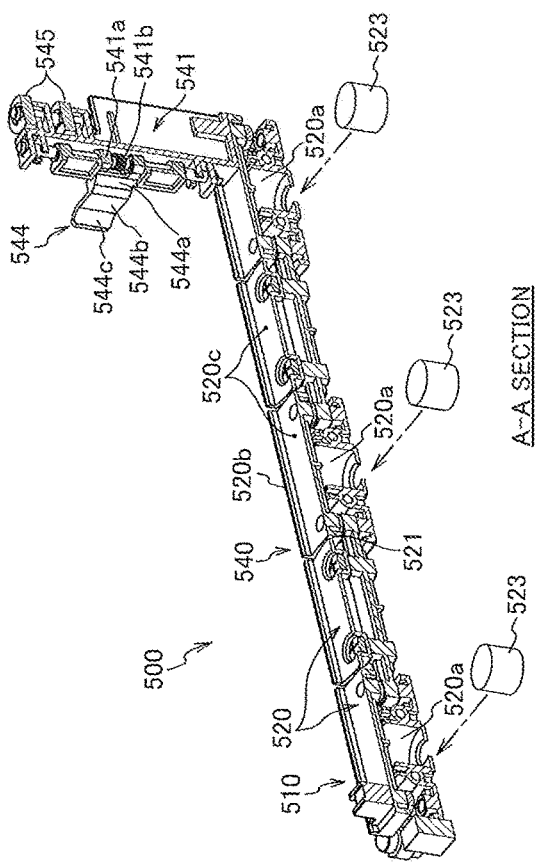
Figure 11B:
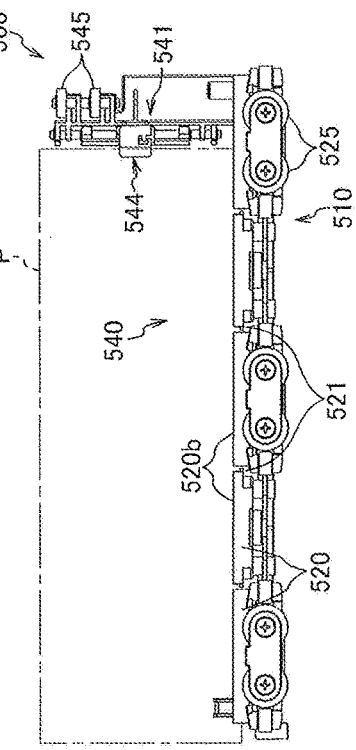
Figure 12A:
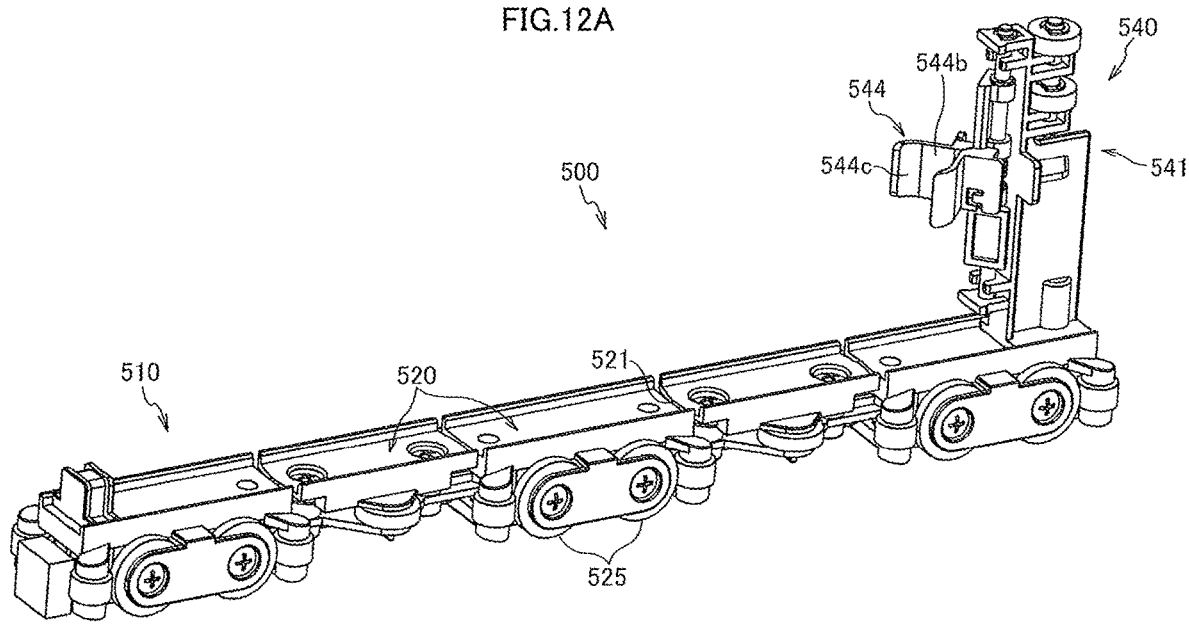
FIGS. 12A and 12B are an exterior perspective view and a plan view of the transport body 500 in a state where the collecting members (the collecting pawls) are closed.
Figure 12B:
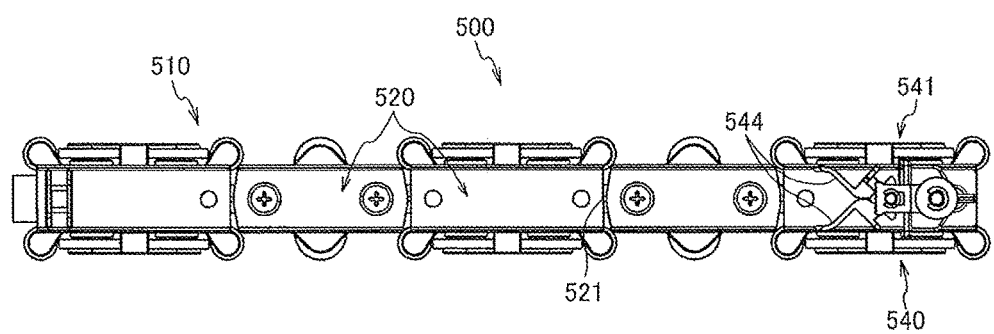

That is, the transport base 510 has a configuration in which the divided pieces 520 are coupled to each other with the hinge parts 521 to be displaceable in the upper-lower or right-left direction (or also in oblique directions) and the transport body magnet (transport body magnetic material) 523 is arranged in an internal space 520a of each of the divided pieces illustrated in FIG. 11D. Rotatable rollers 525 are also arranged on both side surfaces of each of the divided pieces 520 to enable smooth movement inside the transport tube 400. Rollers 545 are rotatably arranged on an upper portion of the support member 541 to reduce resistance with the inner wall of the transport tube.

The banknote collecting/retaining part (transfer means) 540 retains banknotes P to cause the long edge direction of the banknotes P to be in parallel to the longitudinal direction of the transport tube 400 and in an upright attitude. A long side on the lower side of the banknote P horizontally long and in the upright attitude is supported by the upper surface (the flat surface) of the transport base 510 (the divided pieces 520). The rear end edge (one of short sides) of the banknote is supported by the support member 541 and the collecting members 544.

While protrusions 520b preventing dropping of banknotes are provided on each of the divided pieces 520 on both end edges in the width direction, respectively, a region 520c on the inner side of the protrusions 520b is a flat surface and can stably support the long side on the lower side of each banknote. Since the regions 520c on the inner sides of the divided pieces 520 are communicated with each other in the longitudinal direction, banknotes can be placed across the inner regions 520c of plural divided pieces.

The banknote collecting/retaining part 540 erected on the transport base 510 includes, at an end portion of the transport tube 400 on the bank end side in the longitudinal direction (on the distal end side with respect to the cashbox unit 700), the support member 541 that is upright in a direction away from the air blowing tube 100, and the collecting members 544 including the two collecting pawls 544 that are protruded (spread) in the width direction from the support member 541 in a wing-like manner (at an acute angle or an obtuse angle) in plan view and that are pivotally supported by a pivotally support part 541a on the side of the support member 541 to be openable/closable in the horizontal direction. Since the illustrated pivotally support part 541a is in parallel to the support member 541, that is, in a vertical attitude, the collecting pawls 544 rotationally moving on the pivotally support part open and close in the horizontal direction. The rotational movement direction of the collecting pawls may be other directions.

Unlike the configuration example of FIG. 6 in which upper and lower two pairs of the collecting members are arranged, a pair of the collecting members 544 is arranged at a predetermined height location of the support member 541. The two collecting pawls 544 constituting the collecting members 544 are at the maximum open angle in the spread state illustrated in FIG. 11 and cannot rotationally move any more in the opening direction while they can rotationally move in the closing direction from the spread state. FIG. 12 illustrate a state (closed state) in which the two collecting pawls 544 are at the minimum open angle. Each of the collecting pawls 544 is always elastically biased in the opening direction by a spring (elastic member) 541b provided on the pivotally support part 541a. When the transport body 500 moves on the transport path 401 in the forward direction P toward the cashbox unit 700, each of the collecting pawls 544 maintains the spread position due to the spring 541b and the collecting pawls can therefore catch the rear end edge of a banknote stopping in the upright state in a predetermined keeping part 450 (FIG. 13) in which banknotes are retained to transfer the banknote onto the transport base 510 while moving the banknote in the forward direction P in the keeping part. Concave portions 405 (FIG. 13) serving as collecting pawl passages are formed at places that are both inner walls of the transport tube 400 and that are passed by the collecting pawls to enable the collecting pawls to maintain the spread position in the process of movement of the transport base 510 in the transport path 401 in the forward direction P toward the cashbox unit 700, respectively. The concave portions 405 in each of the keeping parts 450 are laid out to enable the associated collecting pawls to be brought into contact with the rear end edge of a banknote in the keeping part. It is preferable that the collecting pawls 544 are configured to independently perform the opening/closing operation. In such a case, each of the collecting pawls may be constituted to be individually rotationally moved by one coil spring (or a torsion spring), or the spring 541b may be provided for each of the collecting pawls.

Each of the collecting pawls 544 in the spread state illustrated in FIG. 11 includes a base end piece 544a on the inner side, which is pivotally supported by the pivotally support part 541a to be rotationally movable, an intermediate piece 544b extending outward in the width direction of the transport body from the base end piece 544a, and an end portion piece 544c bent or curved to be protruded in a diagonally forward direction from the intermediate piece 544b. When the collecting pawl 544 passes through in a keeping part 450, the intermediate piece 544b and the end portion piece 544c mainly enter the keeping part 450 and push the whole banknote in the forward direction while being in contact with the rear end edge of the kept banknote. If the banknote rear end edge being in contact with the intermediate piece 544b is about to be deviated outward in the width direction along a face of the intermediate piece, the end portion piece 544c can reliably block the deviation because the end portion piece 544c is protruded obliquely from an end portion of the intermediate piece 544b. After the kept banknote is transferred onto the transport base 510, the end portion piece 544c prevents the loaded banknotes from being deviated in the width direction or dropping.

With the configuration of the intermediate piece 544b to have an attitude parallel to the width direction of the transport path 401 or oblique to the forward direction P in the spread position of the collecting pawls 544 as illustrated in FIGS. 11, the intermediate piece can reliably catch and press the banknote rear end edge in the forward direction when brought into contact with the rear end edge in each of the keeping parts.

As described above, the collecting members 544 include a pair of the collecting pawls pivotally supported by the support member to be openable and closable in a substantially horizontal direction, and each of the collecting pawls opens and closes between the spread position protruded outward in the width direction and the retracted position retracted inward in the width direction and is biased toward the spread position by the elastic member.

Since each of the collecting pawls 544 has the configuration described above, merely linearly moving the transport body at the time of collecting banknotes in the keeping parts that are alternately positioned at different locations in the longitudinal direction across the transport path 401 enables the banknotes to be reliably collected by the associated collecting pawl and to be accumulated in a central portion of the transport body in the width direction.

When the transport body 500 moves in the retraction direction R in the transport path, the collecting pawls interfere with banknotes in the keeping parts. However, the collecting pawls switch the direction in the closing direction against the biasing of the elastic member in the process of continuing to move in contact with the banknotes. Accordingly, the transport body 500 can smoothly continue to move in the returning direction without providing impact such as damages on the kept banknotes.

Since the method of sequentially loading a collected following banknote with one face of the following banknote stacked on one face (one side surface) of already loaded banknotes in a state where the banknotes are already loaded on the transport base 510 in the upright state is adopted, the front end edge of the following banknote does not hit the rear end edge of the already loaded banknotes to become unloadable.

C. Tube Arrangement Structure in Paper Sheet (Banknote) Transport System According to Third Invention
<Basic Structure of Banknote Transport System>

Next, the arrangement structure of the transport tube 400 (the transport path 401) in the banknote transport system 10 (a banknote transport device C) according to a third invention, and the structures of components that realize this arrangement structure are explained.

Figure 14:
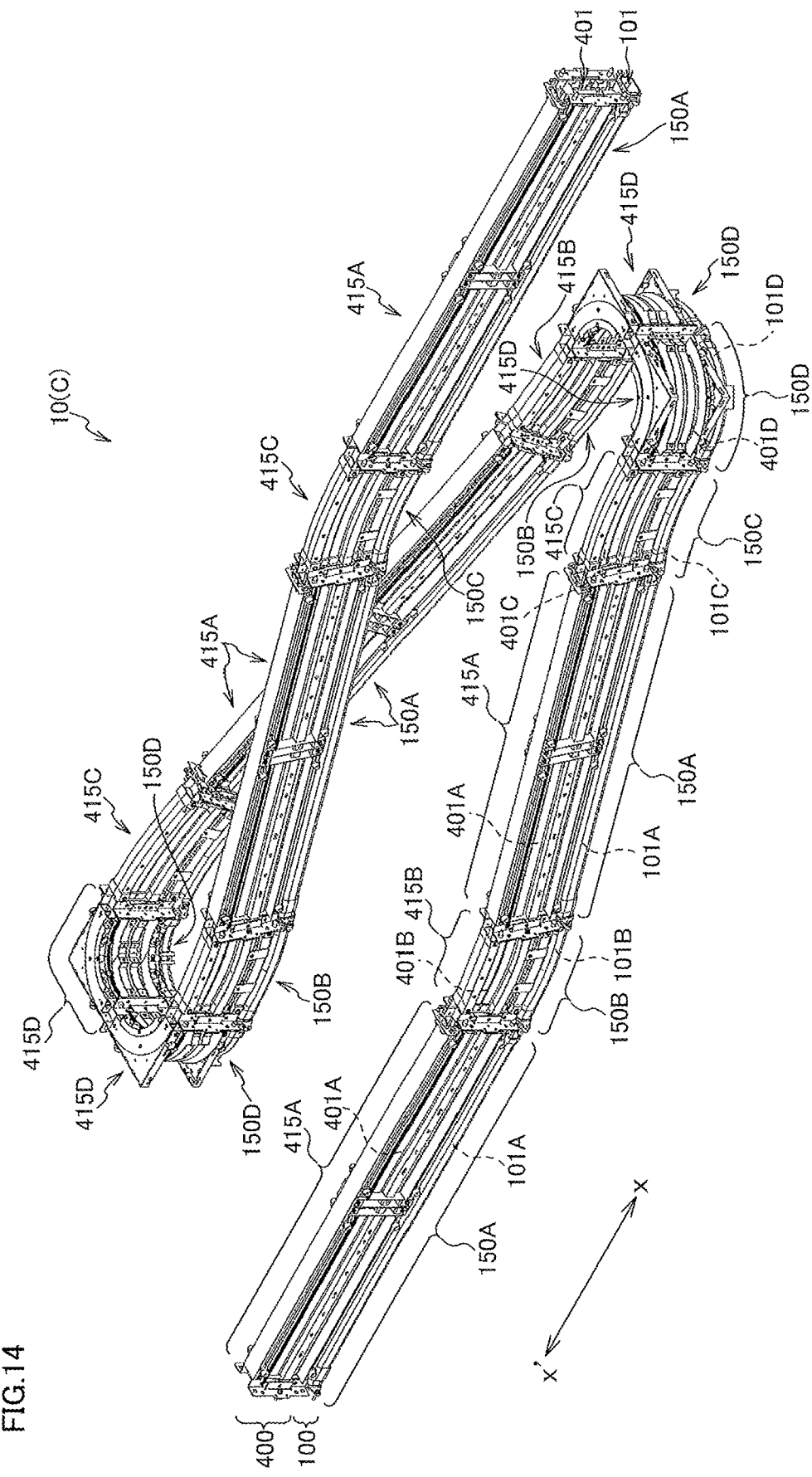
FIG. 14 is a perspective view illustrating an example of an arrangement structure of the air blowing tubes and the transport tubes in a banknote transport device C.

FIG. 14 is a perspective view illustrating an example of the arrangement structure of air blowing tubes and transport tubes in the banknote transport device C. In FIG. 14, the arrows x and x' both show the movement direction of the transport body (banknote transport direction). The arrow x indicates an outward-bound path heading toward the cashbox unit, while the arrow x' indicates a return path heading away from the cashbox unit.

In the following explanations, the drawings and the explanations related to the banknote transport system according to the first invention and the second invention are also referred to, and like parts are denoted by like reference signs.

Figure 5:
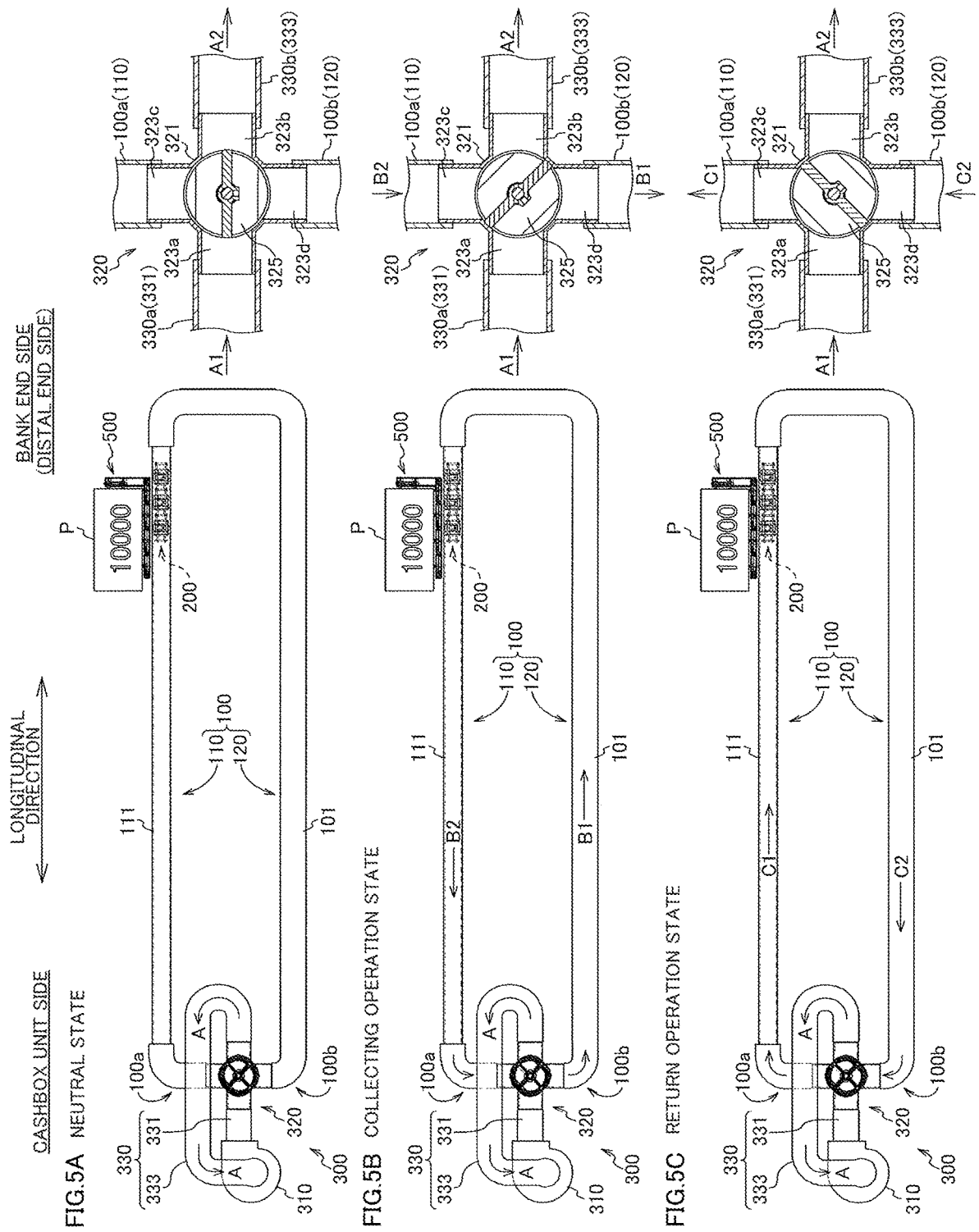
FIGS. 5A to 5C are schematic diagrams illustrating a relation between an air blowing tube and an air-blow control unit according to one embodiment of the first invention.

The banknote transport system 10 (the banknote transport device C) according to the third invention includes the blower (an air flow generating device) 310 (the air-blow control unit 300: FIGS. 3, 5 and the like), the air blowing tube 100 that forms therein a flow path of an air flow generated by the blower (FIGS. 3, 4 and the like), the moving body 200 (FIGS. 4 and 20) that travels inside the air blowing tube while receiving an air flow flowing within the air blowing tube, the transport tube (transport-body route tube) 400 that has at least a portion arranged along the air blowing tube to be adjacent to the air blowing tube, and the transport body 500 (FIGS. 4 and 19) that is configured to be able to retain banknotes (transport target) in a predetermined attitude and that travels inside the transport tube.

As illustrated in FIG. 4, the moving body 200 includes the moving body magnets 213, while the transport body 500 includes the transport body magnets 523. The banknote transport system 10 has a configuration to move the transport body 500 in conjunction with (in synchronization with or in accordance with) movement of the moving body 200 by using a repelling force generated based on a magnetic force applied between the moving body magnets (moving body magnetic material) 213 and the transport body magnets (transport body magnetic material) 523 when there is a proximal positional relation between the moving body magnets and the transport body magnets.

<<Configuration of Transport Tube>>

The transport tube 400 that forms the transport path (transport body route) 401 therein is made up of a plurality of transport tubular-body units 415 (415A to 415D) directly connected in series to each other at their respective longitudinal end portions.

The transport tubular-body unit (straight transport tubular-body unit) 415A forms the transport path 401 (401A) having a straight shape and extending straightly along a predetermined transport plane. The transport plane is an imaginary flat plane, and extends in parallel with (side by side with) a flat bottom surface 411 (411A) illustrated in FIGS. 18 and 19. The value of inclination angle of the transport plane relative to the horizontal plane perpendicular to the gravity direction is determined according to the inclination angle of the tubular-body unit.

The transport tubular-body unit (first curved transport tubular-body unit) 415B forms the transport path 401 (401B) having a first curved shape and bulging into a convex shape toward the air blowing tube 100 (downward). The transport tubular-body unit 415B is located on the inner side relative to an air blowing tubular-body unit 150B (at an inner diameter-side position relative to an air flow path 101B). The transport tubular-body unit 415B is used, for example, when a horizontal transport path is connected to a transport path inclined upward relative to the horizontal plane.

The transport tubular-body unit (second curved transport tubular-body unit) 415C forms the transport path 401 (401C) having a second curved shape and bulging into a convex shape toward the side opposite to the air blowing tube 100 (upward). The transport tubular-body unit 415C is located on the outer side relative to an air blowing tubular-body unit 150C (at an outer diameter-side position relative to an air flow path 101C). The transport tubular-body unit 415C is used, for example, when a horizontal transport path is connected to a transport path inclined downward relative to the horizontal plane.

The transport tubular-body unit 415D (swivel transport tubular-body unit) forms the transport path 401 (401D) having a curved shape extending along a predetermined transport plane. The transport tubular-body unit 415D forms the transport path 401D that is curved in a lateral direction (in a horizontal direction) in plan view (top view). Opposite wall surfaces of the transport tubular-body unit 415D are curved (bulge) sideward in the same direction. One transport tubular-body unit 415D causes the transport body 500 to travel and swivel a predetermined angle (for example, 90 degrees) around within the transport plane.

In the banknote transport system 10, various shapes (layouts) of transport routes are formed by sequentially connecting a terminal end portion of one of the transport tubular-body units, which is appropriately selected from among the transport tubular-body units 415A to 415D, in series with a starting end portion of another transport tubular-body unit with the same shape as, or a different shape from, the one transport tubular-body unit selected.

FIG. 14 illustrates an example of the transport tube 400 that forms a transport path ascending (or descending) in a spiral shape.

<<Configuration of Air Blowing Tube>>

The air blowing tube 100 that forms the air flow path 101 therein is made up of a plurality of air blowing tubular-body units 150 (150A to 150D) directly connected in series to each other at their respective longitudinal end portions.

The air blowing tubular-body unit (straight air blowing tubular-body unit) 150A forms the air flow path 101 (101A) having a straight shape and extending straightly along a predetermined transport plane.

The air blowing tubular-body unit (first curved air blowing tubular-body unit) 150B forms the air flow path 101 (101B) having a first curved shape and bulging into a convex shape toward the side opposite to the transport tube 400 (downward). The air blowing tubular-body unit 150B is curved along the curved shape of the transport tubular-body unit 415B, and is located on the outer side relative to the transport tubular-body unit 415B (at an outer diameter-side position relative to the transport path 401B). The air blowing tubular-body unit 150B is used, for example, when a horizontal air flow path is connected to an air flow path inclined upward relative to the horizontal plane.

The air blowing tubular-body unit (second curved air blowing tubular-body unit) 150C forms the air flow path 101 (101C) having a second curved shape and bulging into a convex shape toward the transport tube 400 (upward). The air blowing tubular-body unit 150C is curved along the curved shape of the transport tubular-body unit 415C, and is located on the inner side relative to the transport tubular-body unit 415C (at an inner diameter-side position relative to the transport path 401C). The air blowing tubular-body unit 150C is used, for example, when a horizontal air flow path is connected to an air flow path inclined downward relative to the horizontal plane.

The air blowing tubular-body unit (swivel air blowing tubular-body unit) 150D forms the air flow path 101 (101D) having a curved shape extending along a predetermined transport plane. The air blowing tubular-body unit 150D forms the air flow path 101D that is curved in a lateral direction (in a horizontal direction) in plan view (top view). Opposite wall surfaces of the air blowing tube 100 are curved sideward in the same direction. One air blowing tubular-body unit 150D causes the moving body 200 to travel and swivel a predetermined angle (for example, 90 degrees) around within the transport plane.

In the banknote transport system 10, various shapes (layouts) of air flow paths are formed by sequentially connecting a terminal end portion of one of the air blowing tubular-body units, which is appropriately selected from among the air blowing tubular-body units 150A to 150D, in series with a starting end portion of another air blowing tubular-body unit with the same shape as, or a different shape from, the one air blowing tubular-body unit selected. FIG. 14 illustrates an example of the air blowing tube 100 that forms an air flow path ascending (or descending) in a spiral shape.

As illustrated in FIG. 3, the air blowing tube 100 (the first air blowing tube 110) that forms the moving route part 111 is located below the transport tube 400 (the transport path 401) in parallel to and in proximity to the transport tube 400. In view of that, the length of each air blowing tubular-body unit 150 is set equal to the length of its corresponding transport tubular-body unit 415.

The shape of the side surfaces (bottom surface or top surface), on which the transport tubular-body units 415A to 415D and their corresponding air blowing tubular-body units 150A to 150D are opposite to each other, is set so as to maintain a constant spacing between the side surfaces. Hereinafter, each set of paired transport tubular-body units 415A to 415D and air blowing tubular-body units 150A to 150D is referred to as a pair of tubular-body units.

<Basic Configuration of Each Tubular-Body Unit>

The basic configuration of the transport tubular-body unit and the air blowing tubular-body unit is explained using an example of straightly-shaped tubular-body units 415A and 150A.

Figure 15:
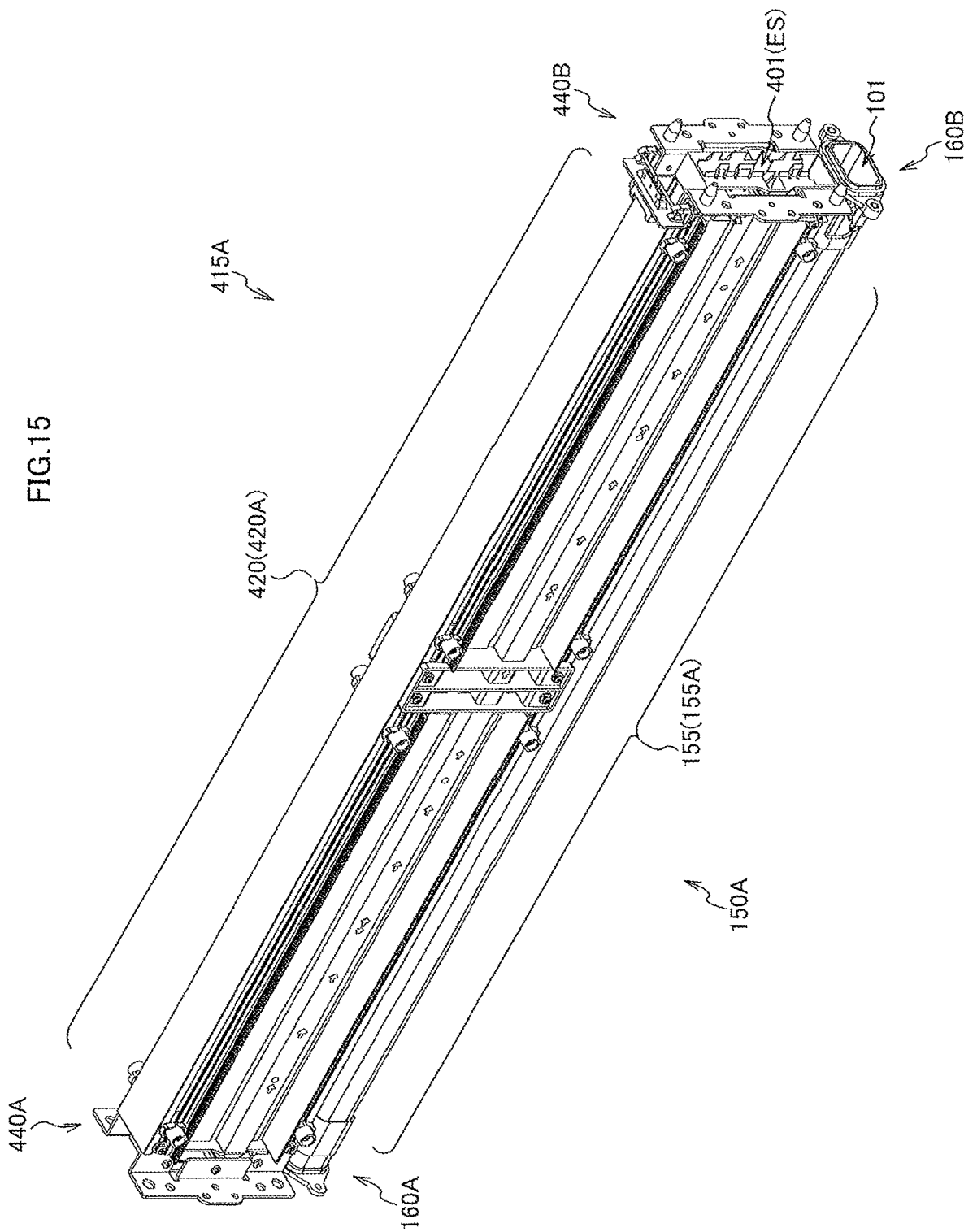
FIG. 15 is a perspective view of a pair of straightly-shaped tubular-body units.
Figure 16A:
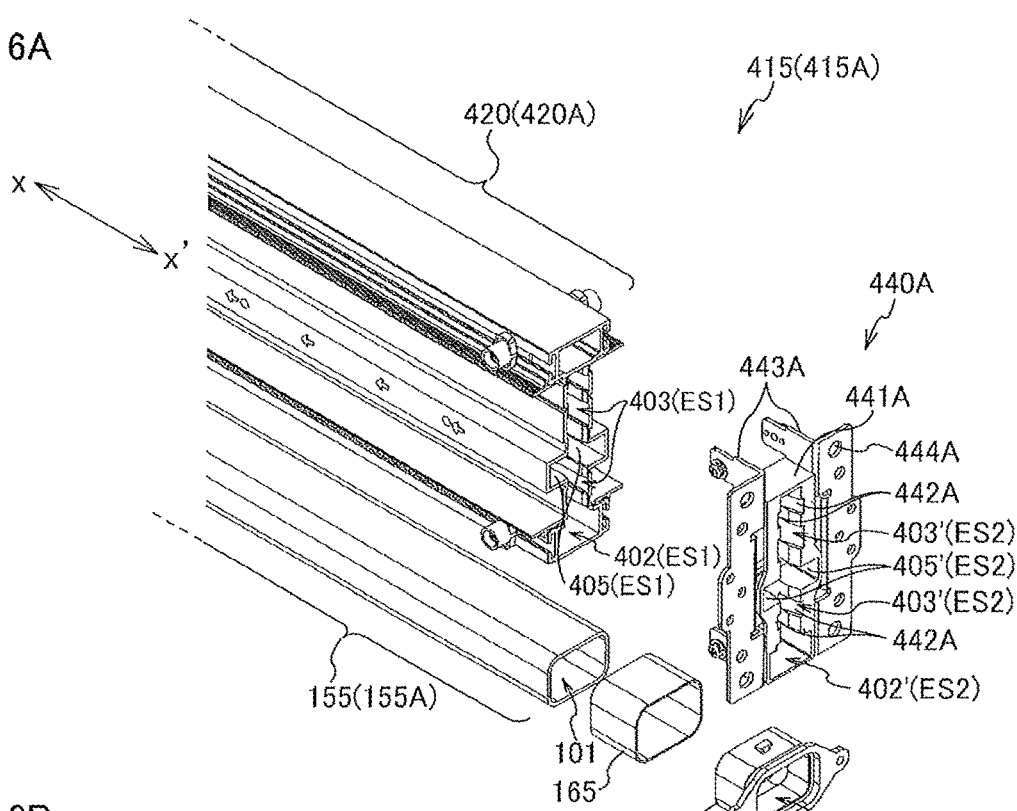
FIGS. 16A and 16B are exploded perspective views illustrating the end portion of the pair of tubular-body units illustrated in FIG. 15.
Figure 16B:
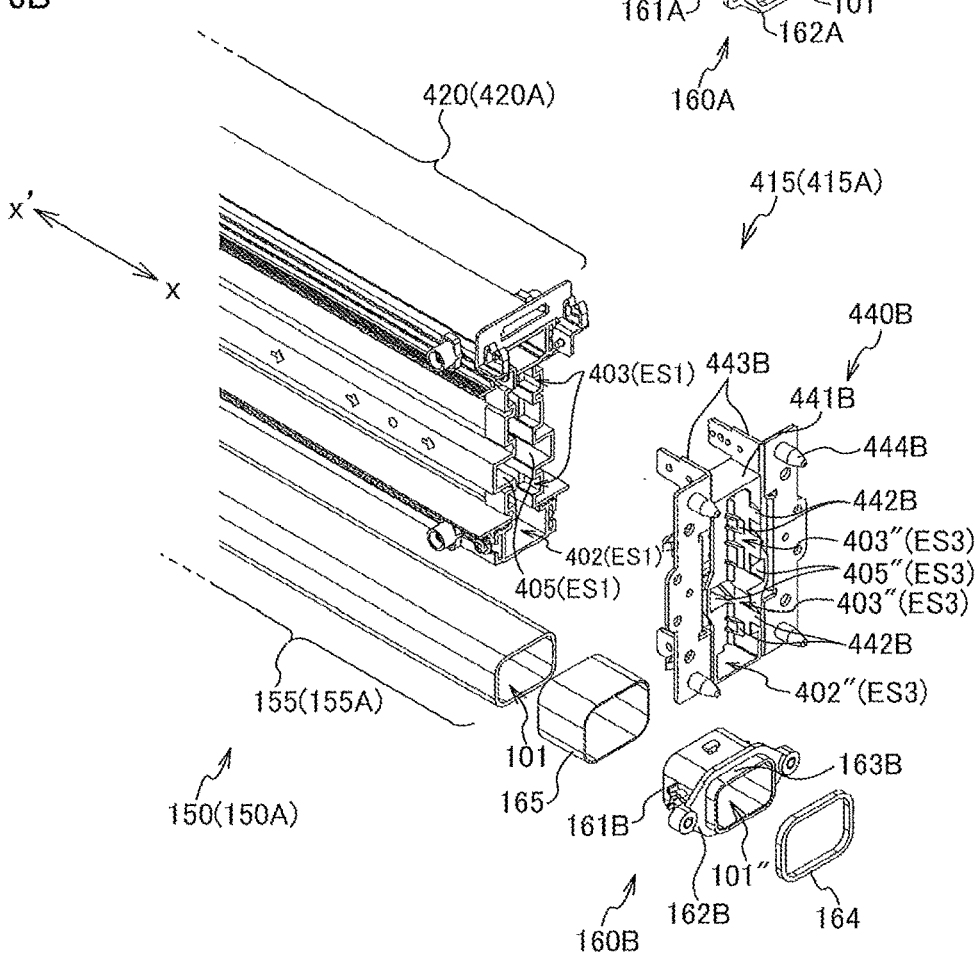

FIG. 15 is a perspective view of a pair of straightly-shaped tubular-body units. FIGS. 16A and 16B are exploded perspective views illustrating the end portion of the pair of tubular-body units illustrated in FIG. 15. FIG. 16A illustrates the starting end-side of the tubular-body units. FIG. 16B illustrates the terminal end-side of the tubular-body units. In FIGS. 16A and 16B, the arrow x indicates the outward-bound path heading toward the cashbox unit, while the arrow x' indicates the return path heading away from the cashbox unit.

<<Basic Configuration of Transport Tubular-Body Unit>>

As illustrated in FIG. 15, the transport tubular-body unit 415 (415A) includes an intermediate tubular body 420 (420A) at its intermediate portion in the transport direction, and also includes end units 440A and 440B at opposite end portions in the transport direction to connect to another transport tubular-body unit 415.

As illustrated in FIG. 16A, a female end unit 440A includes an end tubular body 441A made of resin and having an internal space ES2 that communicates with an internal space ES1 of the intermediate tubular body 420, and a connecting metal fitting 443A located at opposite side portions of the end tubular body 441A to connect to the end unit 440B of another transport tubular-body unit 415.

As illustrated in FIG. 16B, a male end unit 440B includes an end tubular body 441B made of resin and having an internal space ES3 that communicates with the internal space ES1 of the intermediate tubular body 420, and a connecting metal fitting 443B located at opposite side portions of the end tubular body 441B to connect to the end unit 440A of another transport tubular-body unit 415.

An internal space ES (FIG. 15) of the transport tubular-body unit 415A is constituted by the internal space ES1 of the intermediate tubular body 420, the internal space ES2 of the end tubular body 441A, and the internal space ES3 of the end tubular body 441B.

The internal space ES1 of the intermediate tubular body 420 includes the base transport path 402, the banknote transport path 403, and the concave portions 405. The internal space ES2 of the end tubular body 441A includes abase transport path 402', a banknote transport path 403', and concave portions 405'. The internal space ES3 of the end tubular body 441B includes a base transport path 402", a banknote transport path 403", and concave portions 405".

The dimensions of the internal spaces ES1 to ES3 are set so as to allow the transport base 510, the support member 541 (banknote), the collecting pawls 544, and banknotes to smoothly pass through the internal spaces ES1 to ES3 (see FIG. 13).

At respective upper and lower end portions of the connecting metal fitting 443B (at four corners of the outer peripheral portion of the end unit 440B), fitting protrusions 444B are provided protruding in the x direction. At respective upper and lower end portions of the connecting metal fitting 443A (at four corners of the outer peripheral portion of the end unit 440A), receiving holes 444A that receive the fitting protrusions 444B are formed penetrating in the x direction.

From opposite side portions of the banknote transport path 403" of the end tubular body 441B, thin plate-like positioning pieces 442B protrude in the x direction. Each of the positioning pieces 442B has a wedge shape whose thickness gradually decreases toward the tip-end direction. On opposite side portions (opposite inner wall surfaces) of the banknote transport path 403' of the end tubular body 441A, concave portions 442A are provided to receive the positioning pieces 442B to be fitted therein.

When two transport tubular-body units 415 and 415 are connected together, the fitting protrusions 444B on the connecting metal fitting 443B of one of the transport tubular-body units are fitted into the receiving holes 444A on the connecting metal fitting 443A of the other transport tubular-body unit, while the positioning pieces 442B of the end tubular body 441B are fitted into the concave portions 442A of the end tubular body 441A. This facilitates positioning of the two transport tubular-body units such that the internal spaces ES2 and ES3 come into alignment with each other, and enables these two transport tubular-body units to be fixed by screwing or the like.

Each of the transport tubular-body units 415A to 415D includes the end units 440A and 440B. The end units 440A all have an identical shape, and the end units 440B all have an identical shape. Therefore, the transport tubular-body units 415 and 415, whose transport routes have an identical shape or different shapes, can be directly connected in series by using the end units 440A and 440B.

The structure of each of the end units 440A and 440B that connect the transport tubular-body units 415 to each other is merely an example, and any connecting structure may be employed.

<<Basic Configuration of Air Blowing Tubular-Body Unit>>

As illustrated in FIG. 15, the air blowing tubular-body unit 150 (150A) includes an intermediate tubular body 155 (155A) at its intermediate portion in the air blowing direction, and also includes connecting metal fittings 160A and 160B at opposite end portions in the transport direction to connect to another air blowing tubular-body unit 150.

As illustrated in FIG. 16B, a male connecting metal fitting 160B has a configuration in which a fitting cylinder 161B located at one end portion in the longitudinal direction to fit onto an outer peripheral surface of the longitudinal end portion of the intermediate tubular body 155, a flange 162B fixed to the other end portion of the fitting cylinder 161B, and a connecting cylinder 163B protruding outward from the other end face of the flange 162B are integrated into one. The connecting metal fitting 160B has an internal space that communicates with the internal space of the intermediate tubular body 155. A sealing ring 164 is arranged on the outer peripheral surface of the connecting cylinder 163B. In the present embodiment, a tubular airtight member 165 is arranged so as to cover the connecting portion in its entirety, where the end portion of the intermediate tubular body 155 and the fitting cylinder 161B of the connecting metal fitting 160B are connected together.

As illustrated in FIG. 16A, a female connecting metal fitting 160A has a configuration in which a fitting cylinder 161A located at one end portion in the longitudinal direction to fit onto an outer peripheral surface of the longitudinal end portion of the intermediate tubular body 155, and a flange 162A fixed to the other end portion of the fitting cylinder 161A are integrated into one. The connecting metal fitting 160A has an internal space that communicates with the internal space of the intermediate tubular body 155. The inner peripheral surface of the flange 162A has such a set shape as to receive the connecting cylinder 163B to be fitted into the flange 162A. In the present embodiment, the tubular airtight member 165 is also arranged so as to cover the connecting portion in its entirety, where the end portion of the intermediate tubular body 155 and the fitting cylinder 161A of the connecting metal fitting 160A are connected together.

When two air blowing tubular-body units 150 and 150 are connected together, the connecting cylinder 163B of the connecting metal fitting 160B of one of the air blowing tubular-body units is fitted into the flange 162A of the connecting metal fitting 160A of the other air blowing tubular-body unit to screw fix both the flanges 162A and 162B to each other. This enables two air blowing tubular-body units 150 and 150 to be connected to each other, while being positioned in a state in which their internal spaces come into alignment so as to communicate with each other. The sealing ring 164 is attached tightly onto the opposite end faces of the flanges 162A and 162B, thereby ensuring airtightness.

Each of the air blowing tubular-body units 150A to 150D includes the connecting metal fittings 160A and 160B. The connecting metal fittings 160A all have an identical shape, and the connecting metal fittings 160B all have an identical shape. Therefore, the air blowing tubular-body units 150 and 150, whose air flow paths have an identical shape or different shapes, can be directly connected in series by using the connecting metal fittings 160A and 160B.

The structure of each of the connecting metal fittings 160A and 160B that connect the air blowing tubular-body units 150 to each other is merely an example, and any connecting structure may be employed.

<Curved Tubular-Body Unit>

Figure 17:
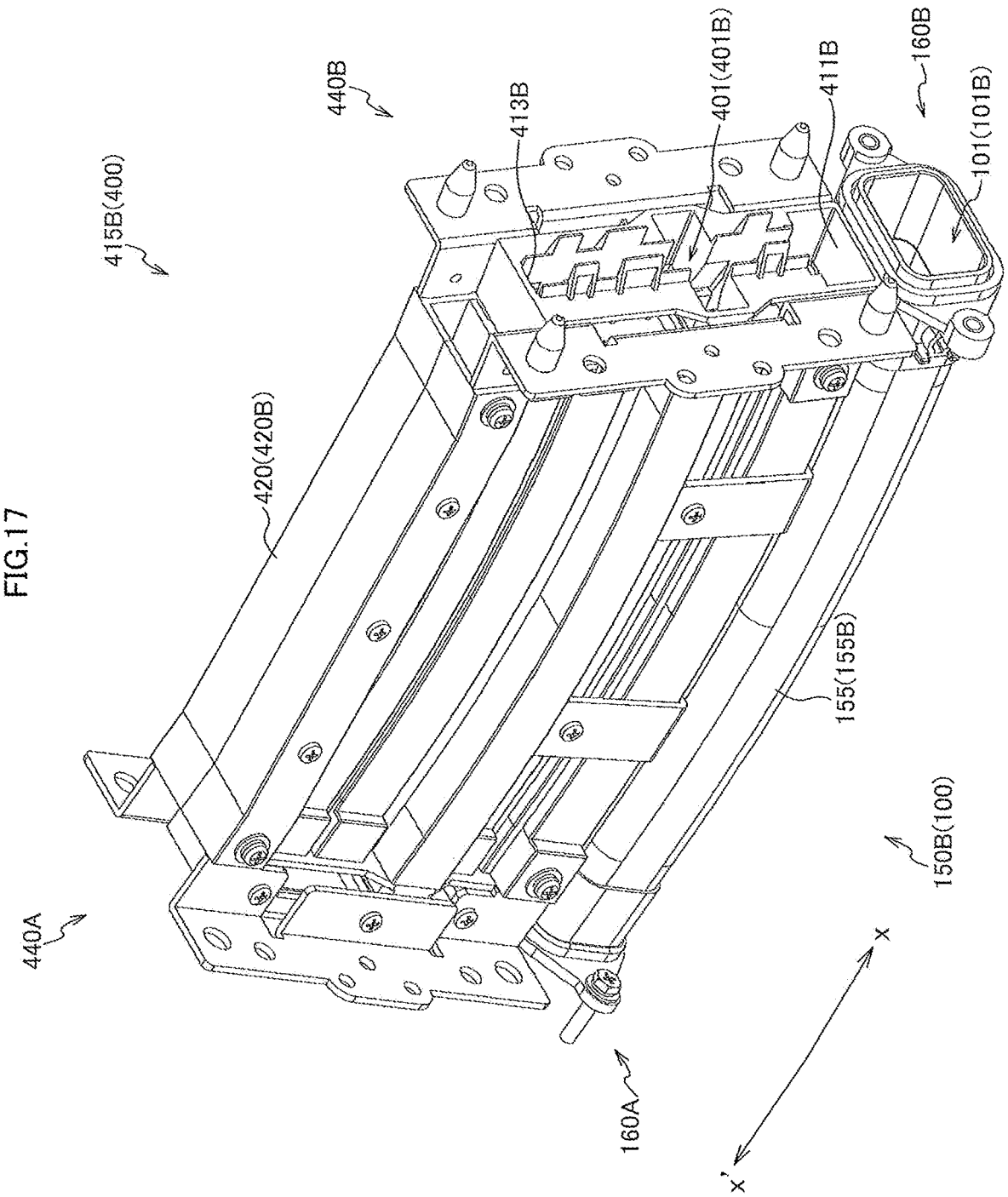
FIG. 17 is a perspective view illustrating a pair of tubular-body units 415B and 150B bulging downward.
Figure 18:
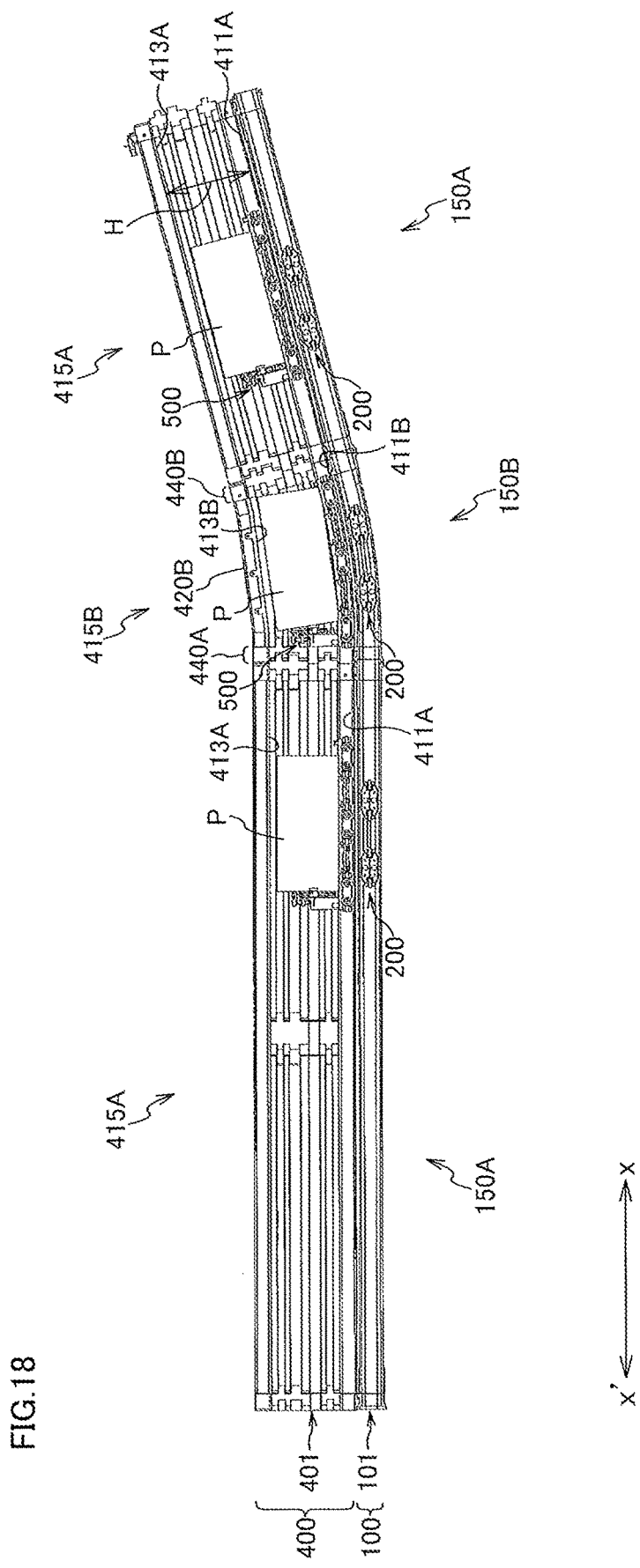
FIG. 18 is a vertical sectional view illustrating an internal state of a transport path and the air flow path including the pair of tubular-body units illustrated in FIG. 17.
Figure 19:
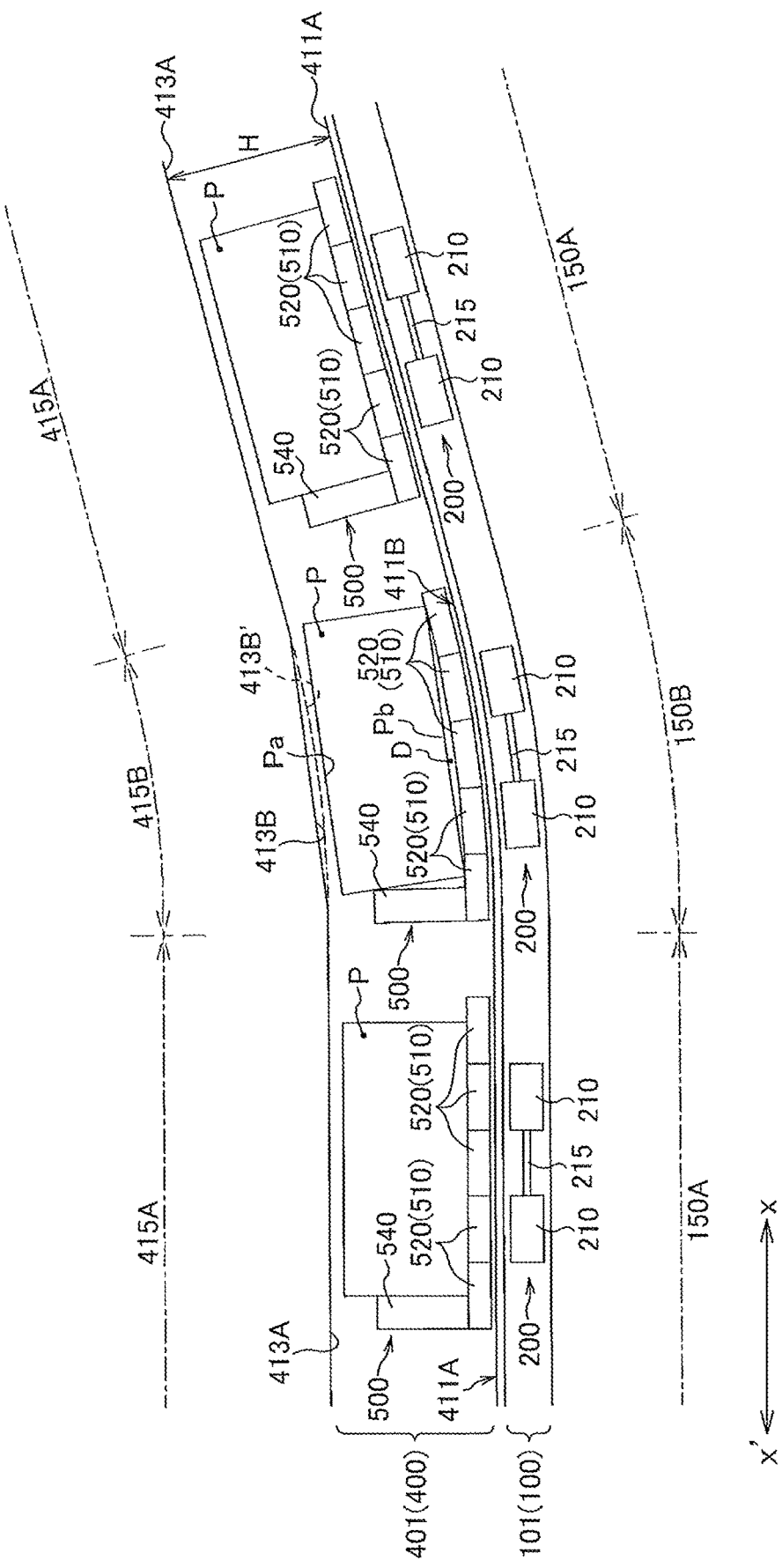
FIG. 19 is a schematic diagram for explaining the positional relation between the members of the transport path and the air flow path illustrated in FIG. 18.
Figure 20:
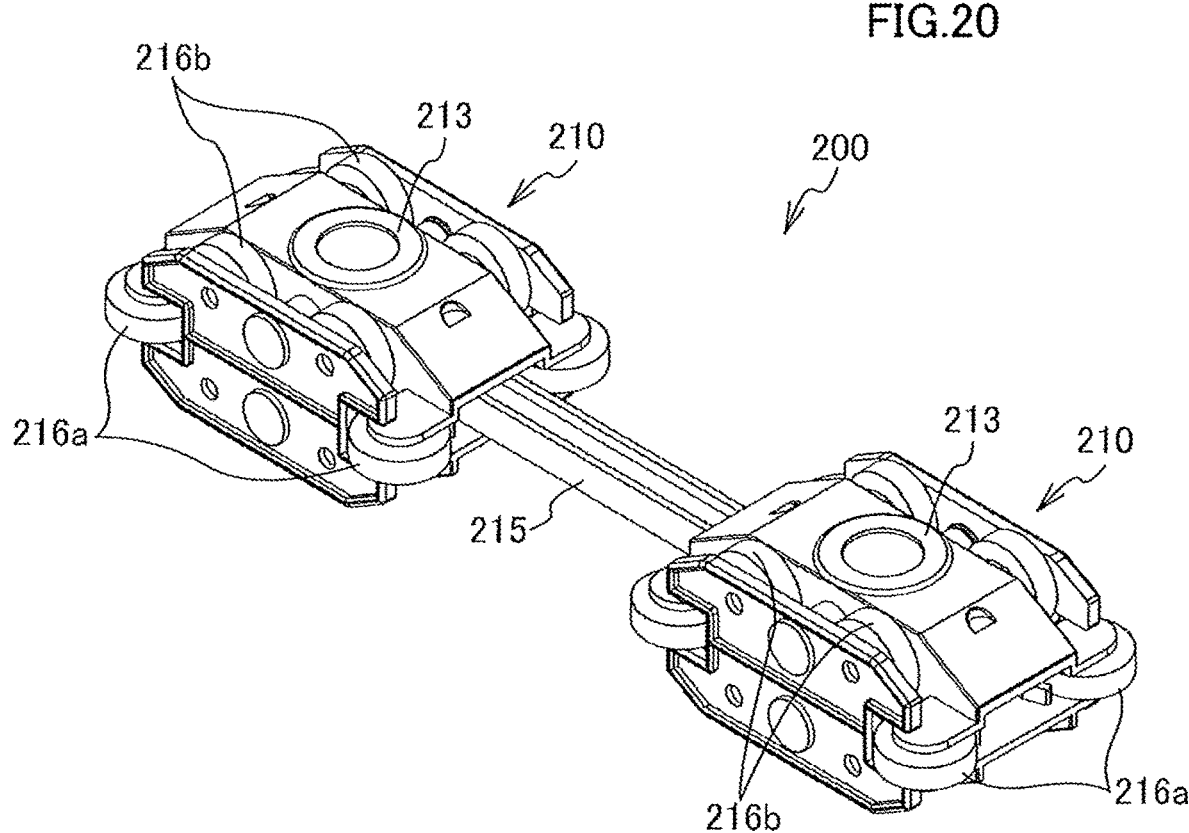
FIG. 20 is an external perspective view of a moving body 200 illustrated in FIG. 18.

FIG. 17 is a perspective view illustrating a pair of tubular-body units 415B and 150B bulging downward. FIG. 18 is a vertical sectional view illustrating the internal state of the transport path and the air flow path including the pair of tubular-body units illustrated in FIG. 17. FIG. 19 is a schematic diagram for explaining the positional relation between the members of the transport path and the air flow path illustrated in FIG. 18. FIG. 20 is an external perspective view of the moving body 200 illustrated in FIG. 18. FIGS. 18 and 19 illustrate a state in which the transport tubular-body units 415A and 415A that are straightly shaped are connected to longitudinally opposite end portions of the transport tubular-body unit 415B bulging downward, while the air blowing tubular-body units 150A and 150A that are straightly shaped are connected to longitudinally opposite end portions of the air blowing tubular-body unit 150B bulging downward. FIG. 18 is a sectional view of a cut cross section taken along the plane of the banknote to be transported.

As illustrated in FIGS. 18 and 19, the transport tube 400 includes a bottom surface 411 (411A and 411B) on which the transport body 500 travels with the rollers 525 (FIG. 11) being in contact with the bottom surface 411, and a top surface 413 (413A and 413B) opposite to the bottom surface 411. The bottom surface 411 is located beside the air blowing tube 100. The present embodiment is characterized in that a distance H (spacing in the up-down direction) between the bottom surface 411B and the top surface 413B of the transport tubular-body unit 415B curved in the up-down direction is configured to increase from each end portion toward the intermediate portion in the transport direction (x direction).

The bottom surface 411B of the transport tubular-body unit 415B is curved at a predetermined curvature such that the bottom surface 411B can maintain a constant distance from the air blowing tubular-body unit 150B. As illustrated in FIGS. 11 to 13, the transport base 510 of the transport body 500 is made up of the plurality of divided pieces (divided bodies) 520 . . . that are sequentially coupled in series along the travel direction. Adjacent divided pieces 520 . . . are coupled with each other through the hinge part 521 to be freely angularly displaced relative to each other in the up-down and left-right directions (or in the oblique directions) within a predetermined range. With this configuration, the divided pieces 520 . . . of the transport base 510 change their positional relation in accordance with the shape of the bottom surface 411 in the process of traveling inside each of the transport tubular-body units 415.

The spatial shape in the cross section orthogonal to the longitudinal direction of the air blowing tube 100 is generally constant throughout the entire longitudinal direction.

The moving body 200 illustrated in FIG. 18 has a different shape from the shape of the moving body illustrated in FIGS. 4, 7, 8, and the like. The moving body 200 illustrated in FIG. 18 is explained below with reference to FIG. 20.

The moving body 200 includes two divided pieces (divided bodies) 210, and a shaft 215 that connects the divided pieces 210. Hinge parts (not illustrated) provided at opposite end portions of the shaft 215 allow the divided pieces to be freely angularly displaced relative to each other in the up-down and left-right directions (or in the oblique directions) within a predetermined range. The divided pieces 210 . . . change their positional relation in accordance with the curved shape of the air blowing tube in the process of traveling inside the air blowing tube 100 (the air blowing tubular-body units 150B to 150D).

The moving body magnets 213 are arranged on the top surface of the divided pieces 210. The moving body 200 is configured such that rollers 216a that rotate in contact with the left and right lateral surfaces of the air blowing tube 100, and rollers 216b that rotate in contact with the upper and lower surfaces of the air blowing tube 100 are arranged at four corners of each of the divided pieces to enable the moving body 200 to move smoothly in the air blowing tube 100.

As described above, a constant distance is maintained between the bottom surface 411 of the transport path 401 and the air blowing tube 100. The transport base 510 of the transport body 500 is deformed in accordance with the shape of the bottom surface 411 in the process of traveling inside the transport tube 400. The moving body 200 is deformed in accordance with the shape of the air blowing tube 100 in the process of traveling inside the air blowing tube 100. As illustrated in FIG. 13, the banknote transport path 403 has a width set smaller than that of the transport base 510, and the transport base is configured to prevent the transport base from deviating from the base transport path 402. With this configuration, a magnetic force required for the transport body 500 to travel can be applied from the moving body magnets 213 moving in the air blowing tubular-body unit 150 to the transport body magnets 523 (see FIGS. 4 and 19) moving in the transport tubular-body unit 415.

As illustrated in FIGS. 18 and 19, in the transport tubular-body unit 415B having the transport path 401 with the bottom surface 411 bulging downward (toward the air blowing tube 100), the shape of the top surface 413B is set so as to avoid a banknote P retained by the transport body 500 from coming into contact (colliding or interfering) with the top surface 413B. That is, the distance H between the bottom surface 411B and the top surface 413B is configured to increase from each end portion toward the intermediate portion in the transport direction. Particularly, in this example, the top surface 413B is configured straightly (into a plane) in the transport direction, thereby increasing the distance H from each end portion toward the intermediate portion in the transport direction.

A regularly rectangular banknote P is placed on the transport base 510 such that two long sides (an upper-end edge Pa and a lower-end edge Pb) extend along the transport direction.

As illustrated in FIG. 19, when the transport body 500 travels in the transport tubular-body unit 415B, the transport base 510 becomes curved and deformed in accordance with the curved shape of the bottom surface 411B. However, each side of the substantially rectangular banknote P placed on the transport base 510 cannot become curved. This creates a gap D between the upper surface of the transport base 510 and the lower-end edge Pb of the banknote P. That is, it is easy for the banknote P to deform its banknote surface (the surface itself of the banknote) from a planar shape to a curved shape. However, it is difficult to curve and deform each side (long sides denoted as Pa and Pb and short sides) of the banknote while maintaining the planar shape of the banknote.

Assuming that the shape of the top surface is set so as to maintain the distance H between the bottom surface 411B and the top surface at a constant distance in the longitudinal direction as illustrated as a top surface 413B' by the dotted line, a spacing between the top surface 413B' and the upper-end edge Pa of the banknote P to be transported (or the upper corner of the banknote P) at the longitudinally intermediate portion of the transport tubular-body unit 415B is reduced, which may cause the banknote to come into contact with the top surface 413B'.

In the present embodiment, as illustrated as the top surface 413B by the solid line, the distance between the bottom surface 411B and the top surface is configured to increase from each end portion toward the intermediate portion in the transport direction to prevent the upper-end edge Pa of the banknote from coming into contact with the top surface 413B. Particularly, in this example, the shape of the top surface 413B of the intermediate tubular body 420B, excluding opposite end parts thereof connecting to the end units 440A and 440B, is configured straightly (into a plane), so that the distance between the bottom surface and the top surface is increased from each end portion toward the intermediate portion in the transport direction. The top surface 413B is formed into a straight (planar) shape to simplify the shape of the top surface 413B.

Similarly to the transport tubular-body unit 415B, the transport tubular-body unit 415C with the top surface 413B bulging upward may also be configured to increase the distance H between the bottom surface 411 and the top surface 413 from each end portion toward the intermediate portion in the transport direction so as to prevent the upper-end edge Pa of the banknote P from coming into contact with the top surface 413. The transport tubular-body unit 415C illustrated in FIG. 14 has a constant distance H between the bottom surface and the top surface. That is, the internal space of the transport tubular-body unit 415C has a constant sectional shape in the longitudinal direction.

A straight transport tubular-body unit 415A and a swivel transport tubular-body unit 415D both have a constant distance between the bottom surface 411 and the top surface 413. That is, the internal space of both the transport tubular-body units has a constant sectional shape in the longitudinal direction.

<Effects>

In the banknote transport system 10, a magnetic force of the moving body 200 traveling in the air blowing tube 100 is used to enable the transport body 500 to travel in the transport tube 400 in conjunction with the moving body 200. With this configuration, it is necessary to maintain the distance between the bottom surface 411 of the transport tube 400 and the air blowing tube 100 in such a positional relation that a magnetic force of the moving body magnets 213 can be exerted on the transport body magnets 523 (for example, at a constant spacing) in the entire longitudinal direction. In contrast, in the transport tubular-body units 415B and 415C curved in the up-down direction, if the distance between the bottom surface 411 and the top surface 413 is constant in the longitudinal direction, there is a possibility that the transported object may come into contact with the top surface. According to the present embodiment, in the transport tubular-body units 415B and 415C curved in the up-down direction, the distance between the bottom surface 411 and the top surface 413 is increased from the end portions toward the intermediate portion in the longitudinal direction, so that the transported object can be prevented from coming into contact with the top surface. This is effective particularly for the transport tubular-body unit 415B in which the top-side radius of curvature is relatively small.

In the banknote transport system 10, various shapes of transport routes can be formed by connecting each terminal end portion of the transport tubular-body units 415A to 415D having the transport paths 401 with a straight shape, a downward convex shape, an upward convex shape, and a shape that allows the transport path to turn a predetermined angle while maintaining the transport height at a constant level, to the starting end portion of another transport tubular-body unit with the same shape or a different shape.

The transport tubular-body units 415A to 415D, which have different shapes from each other, include the end units 440A and 440B at their respective longitudinal end portions. The end units 440A all have an identical shape, and the end units 440B all have an identical shape. This makes it possible for one transport tubular-body unit to connect with any transport tubular-body unit.

[Summary of Configurations, Actions, and Effects of Present Invention]

<First Aspect>

A transport device (a banknote transport system 10) according to the present aspect includes: an air blowing tube 100 that forms a gas flow path; a moving body 200 that travels inside the air blowing tube while receiving an air flow flowing within the air blowing tube in a predetermined direction; a transport body route (a transport path 401) that has at least a portion arranged along the air blowing tube to be adjacent to the air blowing tube; and a transport body 500 that is configured to be able to retain a transport target (banknote P) in a predetermined attitude and that travels inside the transport body route, where the moving body includes a moving body magnetic material (moving body magnets 213), while the transport body includes a transport body magnetic material (transport body magnets 523), and where the transport device has a configuration to move the transport body in conjunction with movement of the moving body by using a repelling force generated based on a magnetic force applied between the moving body magnetic material and the transport body magnetic material when there is a proximal positional relation between the moving body magnetic material and the transport body magnetic material.

In the transport device, the transport body route includes a first curved transport body route (a first curved transport tubular-body unit 415B) having a first curved shape in which a bottom surface 411B located beside the air blowing tube bulges into a convex shape toward the air blowing tube, and the first curved transport body route is configured to increase a distance H between the bottom surface and a top surface 413B opposite to the bottom surface from each end portion toward an intermediate portion in a transport direction x to prevent the transport target retained by the transport body from coming into contact with the top surface.

Some transport targets are difficult to become curved and deformed in a certain direction. It is easy for banknotes as an example of the transport target as described above to deform its banknote surface (the surface itself of the banknote) from a planar shape to a curved shape. However, it is difficult to curve and deform each side (long sides and short sides) of a rectangular banknote while maintaining the planar shape of the banknote surface. For this reason, the curved transport routes that are curved in a direction that is difficult for the banknotes to be curved are not usually employed. If banknotes are transported through a curved transport route in a state in which the planar shape of the banknote surface is maintained, it is necessary for this transport route to have a large radius of curvature. This makes it difficult to downsize the transport route.

According to the present aspect, the distance H between the bottom surface and the top surface in the first curved transport body route is increased from each end portion toward the intermediate portion in the transport direction to prevent the transport target from coming into contact with the top surface. It is thus possible to downsize the curved route.

<Second Aspect>

In the transport device (the banknote transport system 10) according to the present aspect, the transport body 500 includes a transport base 510 having a plurality of divided bodies (divided pieces 520) that are sequentially coupled in series along a travel direction so as to be angularly displaceable relative to each other within a predetermined range.

The transport base becomes deformed in accordance with a curved shape of the bottom surface 411 of the transport body route (the transport path 401), while the transport target (banknote P) retained by the transport base is an object that is difficult to become curved in accordance with curving deformation of the transport base in the first curved transport body route (a first curved transport tubular-body unit 415B).

The transport device (the banknote transport system 10) according to the present aspect has a configuration to move the transport body in conjunction with movement of the moving body 200 by using a repelling force generated based on a magnetic force applied between the moving body magnetic material (moving body magnets 213) and the transport body magnetic material (transport body magnets 523) when there is a proximal positional relation between the moving body magnetic material and the transport body magnetic material. With this configuration, it is necessary for the moving body magnetic material and the transport body magnetic material to travel while maintaining such a constant distance as to apply a magnetic force therebetween. In the present aspect, the transport base is configured to become curved and deformed in accordance with the curved shape of the bottom surface located on the inner surface of the transport body route beside the air blowing tube.

In contrast, it is not always necessary for the transport target retained by the transport body to be able to become curved and deformed in accordance with the deformed shape of the transport base (or the shape of the bottom surface).

As described above, in the transport device, the distance H between the bottom surface and the top surface in the first curved transport body route is increased from each end portion toward the intermediate portion in the transport direction to prevent the transport target, which is difficult to become deformed, from coming into contact with the top surface. According to the present aspect, even in a case where a transport target, which is difficult to become curved and deformed in a certain direction, such as banknotes, is placed and transported on the transport base that can become curved and deformed, it is still possible to downsize the first curved transport body route.

<Third Aspect>

In the transport device (the banknote transport system 10) according to the present aspect, the transport target is a substantially rectangular paper sheet (banknote P), and the paper sheet is retained by the transport base 510 in such a manner that two long sides extend along the transport direction x, and one of the long sides is located beside the bottom surface 411, while the other (an upper-end edge Pa) of the long sides is located beside the top surface 413.

The transport target in the present aspect is a rectangular paper sheet. The paper sheet is retained in such a manner that its lower-end edge (long side) comes in contact with the transport base. The transport body route has such a shape that the bottom surface bulges into a convex shape toward the air blowing tube (downward). The transport base becomes curved and deformed in accordance with this shape. However, it is still difficult for the paper sheet to become deformed in the same direction. For this reason, when the transport body travels along the first curved transport body route (the first curved transport tubular-body unit 415B), a gap is formed between the lower-end edge of the paper sheet and the upper surface of the transport base. This brings the paper sheet into a state where a portion of the paper sheet leaves the transport base. Assuming that the distance between the bottom surface and the top surface of the transport body route is set constant in the transport direction, there is a possibility that the upper-end edge of the paper sheet may come into contact with the top surface.

According to the present aspect, the distance H between the bottom surface and the top surface in the first curved transport body route is increased from each end portion toward the intermediate portion in the transport direction to prevent the upper-end edge of the paper sheet being a transport target from coming into contact with the top surface. It is thus possible to downsize the curved route.

<Fourth Aspect>

In the transport device (the banknote transport system 10) according to the present aspect, in the first curved transport body route (the first curved transport tubular-body unit 415B), the top surface 413B is configured straightly in the transport direction x, so that the distance H between the bottom surface 411B and the top surface is increased from each end portion toward an intermediate portion in the transport direction.

According to the present aspect, the shape of the top surface is simplified into a straight (planar) shape. This facilitates shape design of the first curved transport body route.

<Fifth Aspect>

In the transport device (the banknote transport system 10) according to the present aspect, the transport body route (the transport path 401) has a configuration in which a rear end portion of one transport tubular-body unit, selected from among a straight transport tubular-body unit 415A that forms a straight transport body route extending straightly along a predetermined transport plane, the first curved transport tubular-body unit 415B that forms the first curved transport body route, a second curved transport tubular-body unit 415C that forms a second curved transport body route having a second curved shape in which the bottom surface 411 located beside the air blowing tube 100 bulges into a convex shape toward a side opposite to the air blowing tube, and a swivel transport tubular-body unit 415D that forms a swivel transport body route having a curved shape bulging into a convex shape toward a lateral direction in top view, the swivel transport body route being curved and extending along the predetermined transport plane, is sequentially connected to a starting end portion of another transport tubular-body unit having the same shape as or a different shape from the one transport tubular-body unit selected, and a plurality of the transport tubular-body units connected include at least the first curved transport tubular-body unit.

It is possible to form various shapes (layouts) of transport routes by combining the four types of transport tubular-body units described above. For example, when the transport tubular-body units are connected sequentially in the order described as the first curved transport tubular-body unit, the straight transport tubular-body unit, the second curved transport body route, and the swivel transport tubular-body unit, then it is possible to form a spiral transport body route. This makes it possible to create a space-saving transport route through which a transport target is moved up and down.

REFERENCE SIGNS LIST arrow A, A1, A2 (circulation direction), arrow B, B1, B2 (banknote collecting direction), arrow C, C1, C2 (transport body returning direction), C banknote transport device, ES, ES', ES", ES1 to ES3 internal space, L, L1, L2 game hall facility, P, P1, P2 banknote (paper sheet), Pa upper-end edge, Pb lower-end edge, arrow P forward direction, arrow R retraction direction, x, x' outward-bound path, return path, 1 game machine, 2 sandwiched machine, 10 banknote transport system, 100 air blowing tube, 100a one end portion, 100b other end portion, 101 air flow path, 110 first air blowing tube, 111 moving route part, 120 second air blowing tube, 150 air blowing tubular-body unit, 150A straight air blowing tubular-body unit, 150B first curved air blowing tubular-body unit, 150C second curved air blowing tubular-body unit, 150D swivel transport tubular-body unit, 155, 155A, 155B intermediate tubular body, 160A, 160B connecting metal fitting, 161A, 161B fitting cylinder, 162A, 162B flange, 163B connecting cylinder, 164 sealing ring, 165 airtight member, 200 moving body, 210 divided piece (divided body), 211 hinge part, 213 moving body magnet (moving body magnetic material), 215 shaft, 216a, 216b roller, 300, 300B, 300C air-blow control unit, 310, 310a, 310b blower (air flow generating device), 320 switching unit, 321 casing, 323 flow path, 323a to 323d first to fourth flow path, 325 switching valve, 330 first circulation pipe, 330a one end portion, 330b other end portion, 331 discharge tube, 333 intake tube, 340 connection pipe, 400 transport tube (transport-body route tube), 401 transport path (transport body route), 402 base transport path, 403 banknote transport path, 405 concave portion, 411, 411A, 411B bottom surface, 413, 413A, 413B top surface, 415 transport tubular-body unit, 415A straight transport tubular-body unit, 415B first curved transport tubular-body unit, 415C second curved transport tubular-body unit, 415D swivel transport tubular-body unit, 420, 420B intermediate tubular body, 440A, 440B end unit, 441A, 441B end tubular body, 442A concave portion, 442B positioning piece, 443A, 443B connecting metal fitting, 444A receiving hole, 444B fitting protrusion, 450 keeping part, 500 transport body, 510 transport base, 520 divided piece (divided body), 520a internal space, 520b protrusion, 520c inner region, 521 hinge part, 523 transport body magnet, 525 roller, 540 banknote collecting/retaining part, 541 support member, 541a pivotally support part, 541b spring, 544 collecting pawl (collecting member), 544a base end piece, 544b intermediate piece, 544c end portion piece, 545 roller, 600 receiving unit, 700 cashbox unit, 800 management unit, 801 housing.

What is claimed is:

1. A transport device comprising:
an air blowing tube that forms a gas flow path;
a moving body that travels inside the air blowing tube while receiving an air flow flowing within the air blowing tube in a predetermined direction;
a transport body route that has at least a portion arranged along the air blowing tube to be adjacent to the air blowing tube; and
a transport body that is configured to be able to retain a transport target in a predetermined attitude and that travels inside the transport body route,
where the moving body includes a moving body magnetic material, while the transport body includes a transport body magnetic material, and
where the transport device has a configuration to move the transport body in conjunction with movement of the moving body by using a repelling force generated based on a magnetic force applied between the moving body magnetic material and the transport body magnetic material when there is a proximal positional relation between the moving body magnetic material and the transport body magnetic material, wherein
the transport body route includes a first curved transport body route having a first curved shape in which a bottom surface located beside the air blowing tube bulges into a convex shape toward the air blowing tube, and
the first curved transport body route is configured to increase a distance between the bottom surface and a top surface opposite to the bottom surface from each end portion toward an intermediate portion in a transport direction to prevent the transport target retained by the transport body from coming into contact with the top surface.

2. The transport device according to claim 1, wherein
the transport body includes a transport base having a plurality of divided bodies that are sequentially coupled in series along a travel direction so as to be angularly displaceable relative to each other within a predetermined range, and
the transport base becomes deformed in accordance with a curved shape of the bottom surface of the transport body route, while the transport target retained by the transport base is an object that is difficult to become curved in accordance with curving deformation of the transport base in the first curved transport body route.

3. The transport device according to claim 2, wherein the transport target is a substantially rectangular paper sheet, and the paper sheet is retained by the transport base in such a manner that two long sides extend along the transport direction, and one of the long sides is located beside the bottom surface, while the other of the long sides is located beside the top surface.

4. The transport device according to claim 1, wherein in the first curved transport body route, the top surface is configured straightly in the transport direction, so that a distance between the bottom surface and the top surface is increased from each end portion toward an intermediate portion in the transport direction.

5. The transport device according to claim 1, wherein the transport body route has a configuration in which a rear end portion of one transport tubular-body unit, selected from among a straight transport tubular-body unit that forms a straight transport body route extending straightly along a predetermined transport plane, a first curved transport tubular-body unit that forms the first curved transport body route, a second curved transport tubular-body unit that forms a second curved transport body route having a second curved shape in which the bottom surface located beside the air blowing tube bulges into a convex shape toward a side opposite to the air blowing tube, and a swivel transport tubular-body unit that forms a swivel transport body route having a curved shape bulging into a convex shape toward a lateral direction in top view, the swivel transport body route being curved and extending along the predetermined transport plane, is sequentially connected to a starting end portion of another transport tubular-body unit having a same shape as or a different shape from the one transport tubular-body unit selected, and a plurality of the transport tubular-body units connected include at least the first curved transport tubular-body unit.

* * * * *